US008810661B2

(12) United States Patent
Mizutani et al.

(10) Patent No.: US 8,810,661 B2
(45) Date of Patent: Aug. 19, 2014

(54) PROGRAM OF MOBILE DEVICE, MOBILE DEVICE, AND METHOD FOR CONTROLLING MOBILE DEVICE

(75) Inventors: Kana Mizutani, Nagoya (JP); Yuji Miyata, Kitanagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 124 days.

(21) Appl. No.: 13/247,498

(22) Filed: Sep. 28, 2011

(65) Prior Publication Data
US 2012/0075485 A1 Mar. 29, 2012

(30) Foreign Application Priority Data

Sep. 29, 2010 (JP) ................................ 2010-218594
Mar. 31, 2011 (JP) ................................ 2011-079992
Apr. 19, 2011 (JP) ................................ 2011-093375
Sep. 21, 2011 (JP) ................................ 2011-206143
Sep. 21, 2011 (JP) ................................ 2011-206144

(51) Int. Cl.
*H04N 5/225* (2006.01)
*H04M 1/00* (2006.01)
*H04M 1/725* (2006.01)
*H04N 1/00* (2006.01)
*H04W 88/02* (2009.01)
*H04W 64/00* (2009.01)

(52) U.S. Cl.
CPC ........ *H04M 1/7253* (2013.01); *H04M 2250/10* (2013.01); *H04M 2250/06* (2013.01); *H04N 2201/0084* (2013.01); *H04N 2201/0015* (2013.01); *H04N 2201/0094* (2013.01); *H04N 1/0044* (2013.01); *H04W 88/02* (2013.01); *H04N 1/00323* (2013.01); *H04N 1/00347* (2013.01); *H04N 1/00307* (2013.01); *H04W 64/006* (2013.01); *H04M 2250/52* (2013.01); *H04N 1/00244* (2013.01); *H04N 2201/0055* (2013.01); *H04N 2250/02* (2013.01); *H04N 1/00408* (2013.01); *H04W 64/00* (2013.01)
USPC ...................................... 348/207.2; 455/552.1

(58) Field of Classification Search
USPC ............ 358/1.15; 455/552; 348/207.2, 207.1
See application file for complete search history.

(56) References Cited

U.S. PATENT DOCUMENTS 6,654,060 B1 11/2003 Kurosawa et al.
6,806,978 B1 * 10/2004 Tamura et al. ............... 358/1.15

(Continued)

FOREIGN PATENT DOCUMENTS

JP 10-200790 7/1998
JP 2002-244831 A 8/2002

(Continued)

OTHER PUBLICATIONS

U.S. Appl. No. 13/247,483, filed Sep. 28, 2011.

(Continued)

*Primary Examiner* — Mekonnen Dagnew
(74) *Attorney, Agent, or Firm* — Scully, Scott, Murphy & Presser, P.C.

(57) ABSTRACT

A computer-readable recording device may store a computer program including instructions for causing a computer of a mobile device to operate as: (1) an image specifying module that specifies a plurality of partial images corresponding to a plurality of candidate devices within a taken image that is displayed by a display unit provided in the mobile device, and (2) a communication controlling module that controls a communication unit configured to communicate using a wireless network such that the communication unit communicates with a candidate device corresponding to the partial image, in a case where an operation unit configured to receive an operation on the mobile device by a user receives a selection of the partial image.

20 Claims, 19 Drawing Sheets

(56) References Cited

U.S. PATENT DOCUMENTS

| | | |
|---|---|---|
| 2003/0093675 A1 | 5/2003 | Hibino et al. |
| 2004/0080625 A1 | 4/2004 | Kurosawa et al. |
| 2005/0164633 A1 | 7/2005 | Linjama et al. |
| 2006/0171357 A1 | 8/2006 | King et al. |
| 2007/0133843 A1* | 6/2007 | Nakatani ................... 382/115 |
| 2007/0234354 A1* | 10/2007 | Hattori ..................... 717/177 |
| 2007/0244963 A1 | 10/2007 | Hibino et al. |
| 2007/0245014 A1 | 10/2007 | Hibino et al. |
| 2009/0021776 A1* | 1/2009 | Dolan et al. ................ 358/1.15 |
| 2009/0054077 A1 | 2/2009 | Gauthier et al. |
| 2009/0227268 A1 | 9/2009 | Sorensson et al. |
| 2010/0238491 A1* | 9/2010 | Shiimori et al. ............ 358/1.15 |
| 2010/0245886 A1* | 9/2010 | Okajima et al. ............ 358/1.15 |
| 2011/0124350 A1 | 5/2011 | Sukovic |
| 2012/0075485 A1 | 3/2012 | Mizutani et al. |

FOREIGN PATENT DOCUMENTS

| | | |
|---|---|---|
| JP | 2003-150354 | 5/2003 |
| JP | 2008-293356 A | 12/2008 |

OTHER PUBLICATIONS

U.S. Appl. No. 13/247,492, filed Sep. 28, 2011.

U.S. Office Action dated Aug. 3, 2012, received in related U.S. Appl. No. 13/247,483.

* cited by examiner

FIG. 6

| Memory Number | MFP Name | IP Address | MFP Location Information | Sheet Size Information | Print Type Information | Idling Print Job Information | Relative Direction | Relative Distance |
|---|---|---|---|---|---|---|---|---|
| 1 | First MFP | 192.168.0.1 | □□□ | A4 | Color | 0 | D1 | R1 |
| 2 | Second MFP | 192.168.0.2 | △△△ | A4 | Black and White | 0 | D2 | R2 |
| 3 | Third MFP | 192.168.0.3 | ○○○ | A3 | Black and White | 0 | D3 | R3 |

FIG. 19

| Memory Number | MFP Name | IP Address | MFP Location Information | Model Number Information | File Information | Relative Direction | Relative Distance |
|---|---|---|---|---|---|---|---|
| 1 | First MFP | 192.168.0.1 | □□□ | MFP-100 | PDF, JPEG | D1 | R1 |
| 2 | Second MFP | 192.168.0.2 | △△△ | MFP-200 | PDF, JPEG | D2 | R2 |
| 3 | Third MFP | 192.168.0.3 | ○○○ | MFP-300 | PDF, XPS, JPEG | D3 | R3 |

| Image Location | MFP Information | Display Location Image Information |
|---|---|---|
| P1 | First MFP | B1c |
| P2 | Second MFP | B2c |
| P3 | Third MFP | B3c |

261, 262, TB2, 263c

PROGRAM OF MOBILE DEVICE, MOBILE DEVICE, AND METHOD FOR CONTROLLING MOBILE DEVICE

CROSS-REFERENCE TO RELATED APPLICATIONS

This application claims priority to Japanese Patent Application No. 2010-218594, filed on Sep. 29, 2010, Japanese Patent Application No. 2011-079992, filed on Mar. 31, 2011, Japanese Patent Application No. 2011-093375, filed on Apr. 19, 2011, Japanese Patent Application No. 2011-206143, filed on Sep. 21, 2011, and Japanese Patent Application No. 2011-206144, filed on Sep. 21, 2011, the contents of which are hereby incorporated by reference into the present application.

TECHNICAL FIELD

The present application relates to a program of a mobile device, the mobile device, and a method for controlling the mobile device enabling a selection of an apparatus to engage in wireless communication by a simple procedure.

DESCRIPTION OF RELATED ART

A technique is known which connects a mobile device (a notebook personal computer, a mobile phone, or the like) and an apparatus (a printer or the like) by wireless communication (wireless LAN, Bluetooth, or the like). Radio waves in the wireless communication have no directionality and are transmitted all around the mobile device. Therefore, a presence of a plurality of apparatuses around the mobile device means that there is a plurality of destination candidates that may be engaged in the wireless communication. A technique is known which, in this case, displays a list of identification information (addresses, names, or the like) of apparatuses capable of wireless communication on a display unit of the mobile device to prompt a user to select a destination apparatus.

BRIEF SUMMARY

Conventionally, a technique is disclosed in which a mobile device and an image forming apparatus are provided with GPS (Global Positioning System) receivers and, based on coordinate data generated by GPS, the mobile device transmits print data to a nearest image forming apparatus. However, with the conventional technique, the mobile device may inadvertently transmit the print data to an image forming apparatus located behind a user. Therefore, the conventional technique had not necessarily been convenient for the user. The present specification provides a technique capable of eliminating such inconveniences.

In one aspect of the teachings disclosed herein, a computer-readable recording device may be provided. The computer-readable recording device may store a computer program including instructions for causing a computer of a mobile device to operate as: an image specifying module specifies a plurality of partial images corresponding to a plurality of candidate devices within a taken image that is displayed by a display unit provided in the mobile device, wherein the taken image is displayed based on image data obtained by the mobile device by taking an object to be taken including the plurality of candidate devices with a camera unit provided in the mobile device, the image specifying module specifies the plurality of partial images based on first information, second information and third information, the first information indicates a physical location of the mobile device, the second information indicates a plurality of physical locations of the plurality of candidate devices, the third information indicates an image-taking direction of the camera unit, and the image-taking direction is a direction having a location of the mobile device as its reference; and a communication controlling module that controls a communication unit configured to communicate using a wireless network such that the communication unit perform a wireless communication with a particular candidate device corresponding to a particular partial image among the plurality of partial images, in a case where an operation unit configured to receive an operation on the mobile device by a user receives a specific operation for selecting the particular partial image.

BRIEF DESCRIPTION OF DRAWINGS

FIG. 6 is a diagram showing an example of stored contents of a storage table.
FIG. 19 is a diagram showing an example of stored contents of a storage table.

DETAILED DESCRIPTION

Figure 1:
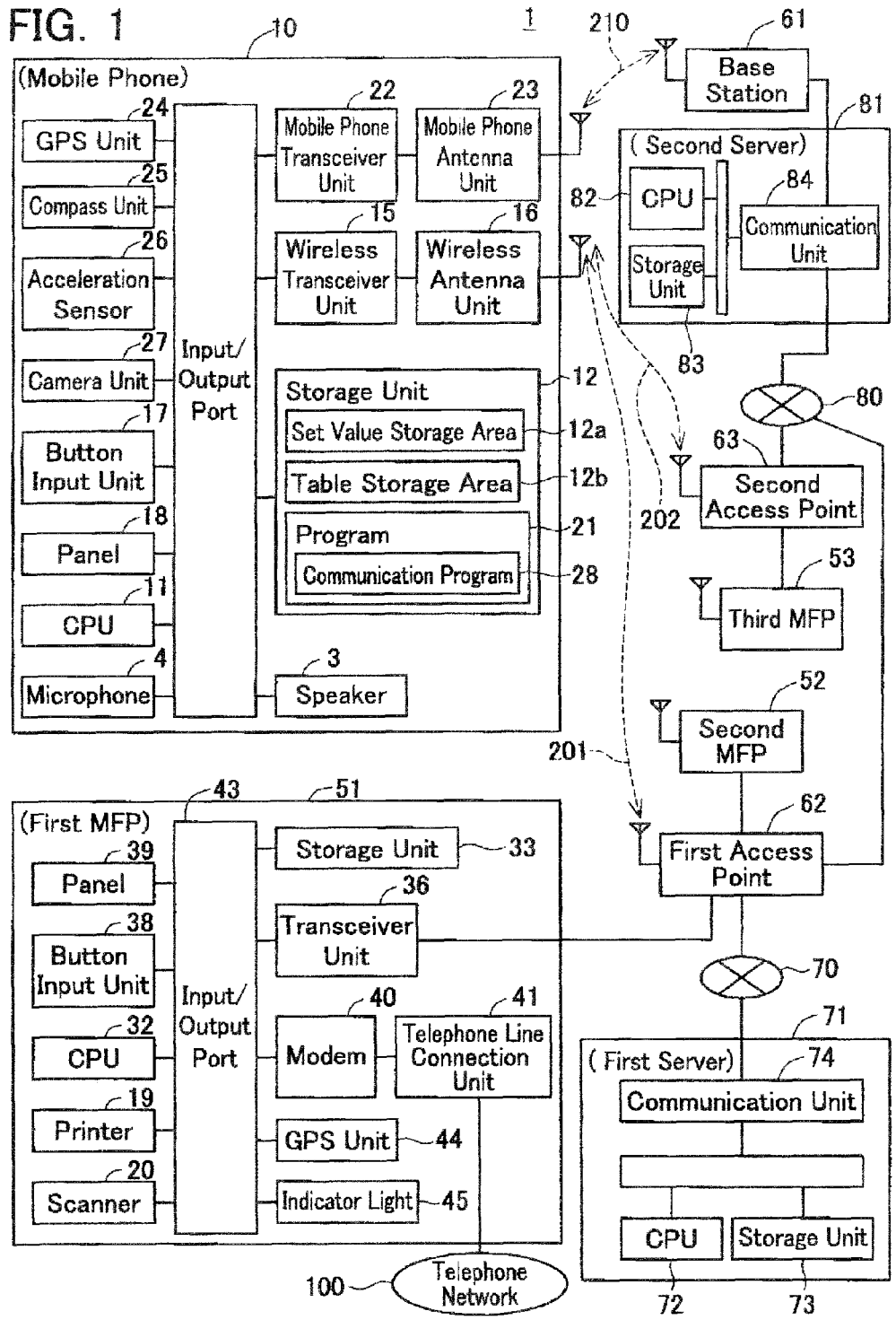
FIG. 1 is a block diagram of a communication system 1.

FIG. 1 shows a block diagram of a communication system 1 exemplified as a first embodiment of the present application. The communication system 1 comprises a mobile phone 10, first to third MFPs 51 to 53, a first access point 62, a second access point 63, a first server 71, a second server 81, and a base station 61. The mobile phone 10 and the first to third MFPs 51 to 53 are each equipped with a function as a known wireless LAN terminal device. The first to third MFPs 51 to 53 are multifunction peripheral devices equipped with a printer function, a scanner function, a copier function, a facsimile function, and the like. The first to third MFPs 51 to 53 are equipped with a communication function which uses a telephone network 100. The first access point 62 and the second access point 63 are equipped with a function as a known wireless LAN access point. The first server 71 is connected to the access point 62 via the Internet 70. The second server 81 is connected to the base station 61 and the Internet 80.

The mobile phone 10 and the first access point 62 are configured to be capable of performing wireless communication (data communications using radio waves) 201 conforming to a wireless LAN infrastructure mode (a mode in which a plurality of wireless LAN terminal devices performs data communication via an access point). The first access point 62 and the first server 71 are communicably connected via the Internet 70. In other words, once the mobile phone 10 accesses the first access point 62 and enters a state where wireless communication 201 conforming to a wireless LAN infrastructure mode can be performed, the mobile phone 10 can perform data communication with the first MFP 51 and the first server 71 via the first access point 62. Similarly, the mobile phone 10 and the second access point 63 are configured to be capable of performing wireless communication 202. Once the mobile phone 10 enters a state where wireless communication 202 can be performed, the mobile phone 10 can perform data communication with the third MFP 53 and the second server 81 via the second access point 63. Examples of wireless LAN systems include a communication system specified by the IEEE802.11a/b/g/n standard.

A configuration of the mobile phone 10 will be described. As shown in FIG. 1, the mobile phone 10 mainly comprises a CPU (Central Processing Unit) 11, a storage unit 12, a wireless transceiver unit 15, a wireless antenna unit 16, a button input unit 17, a panel 18, a mobile phone transceiver unit 22, a mobile phone antenna unit 23, a GPS unit 24, a compass unit 25, an acceleration sensor 26, and a camera unit 27. A speaker 3 and a microphone 4 are provided for making calls and inputting sound.

Figure 10:
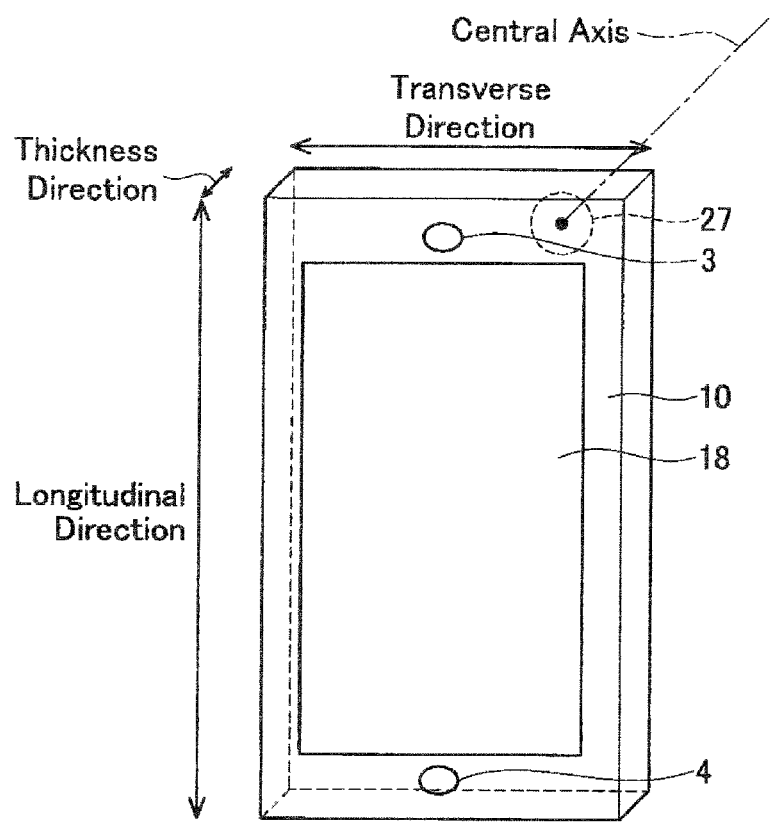
FIG. 10 is a schematic view of the mobile phone.

FIG. 10 shows a schematic view of the mobile phone 10. As shown in FIG. 10, an opening of the speaker 3 and an opening of the microphone 4 are arranged on an installation face where the panel 18 is installed so that operations of the mobile phone 10 and calls using the mobile phone 10 may be easily performed. The opening of the speaker 3, the panel 18, and the opening of the microphone 4 are aligned in a longitudinal direction of the mobile phone 10 so that the opening of the speaker 3 and the opening of the microphone 4 are separated by a distance similar to a distance between the mouth and the ear of a user. The camera unit 27 is arranged on a face opposite to the panel 18 (on a rear face side relative to the installation face).

The CPU 11 executes processing according to programs stored in the storage unit 12. Hereinbelow, the CPU 11 executing programs, such as a communication program 28 or an operating system, may sometimes be simply referred to by a program name. For example, the description "the communication program 28" may sometimes mean "the CPU 11 executing the communication program 28". The storage unit 12 is configured by combining a RAM (Random Access Memory), a ROM (Read Only Memory), a flash memory, an HDD (Hard Disk Drive), a buffer provided in the CPU 11, and the like. The wireless transceiver unit 15 performs wireless communications 201 and 202 conforming to a wireless LAN infrastructure mode via the wireless antenna unit 16. Digital signals constituting various data are transmitted and received by the wireless transceiver unit 15. The GPS unit 24 is a member which receives radio waves from a GPS satellite and which calculates location information indicating a physical location of the mobile phone 10. The term "physical location" herein may also be termed "absolute location". Location information includes latitude, longitude, and height components. The mobile phone transceiver unit 22 performs wireless communication 210 conforming to a mobile phone communication system with the base station 61 via the mobile phone antenna unit 23. The storage unit 12 stores a program 21. The program 21 includes a basic program (not shown), a communication program 28, and the like. The basic program includes a program for causing the mobile phone transceiver unit 22 to execute communication, a program for causing the wireless transceiver unit 15 to execute the wireless communication 201, and the like. The basic program is also a program which provides an API (Application Programming Interface) that enables respective programs to acquire information calculated by the GPS unit 24. The communication program 28 is a program which causes the CPU 11 to execute an operational flow of the communication system 1, which will be described later.

The storage unit 12 comprises a set value storage area 12a, and a table storage area 12b. The set value storage area 12a, stores a predetermined period, a predetermined acceleration value, an allowable angular range, a predetermined distance, a predetermined radius, and the like which will be described later. The table storage area 12b, stores a storage table TB1. FIG. 6 shows an example of the storage table TB1. The storage table TB1 assigns a memory number 220 to each of the first to third MFPs 51 to 53, and associatively stores MFP identification information 230, MFP location information 240, a relative direction 241, a relative distance 242, and status information 250. The MFP identification information 230 is information that is unique to each of the first to third MFPs 51 to 53. The MFP identification information 230 is, for example, an IP address 232 of a corresponding MFP. An MFP name 231 is a name assigned to each of the first to third MFPs 51 to 53 by a user or administrator of the MFP or by a manufacturer prior to shipment. The MFP location information 240 is information indicating a physical location of the first to third MFPs 51 to 53 and includes latitude, longitude, and height components. The mobile phone 10 receives information indicating a physical location from an MFP, and stores the information in the storage table TB1 without modification as the MFP location information 240 of the MFP. The relative direction 241 is information indicating directions in which the first to third MFPs 51 to 53 are located in relation to a location of the mobile phone 10 (directions with the mobile phone 10 as the reference). The relative direction 241 includes a horizontal component (a direction in which an MFP is located in relation to the mobile phone 10 when the mobile phone 10 and the location of the MFP relative to the mobile phone 10 are projected on a horizontal plane) and a vertical component (a direction in which the MFP is located in relation to the mobile phone 10 when the mobile phone 10 and the location of the MFP relative to the mobile phone 10 are projected on a vertical plane that is perpendicular to another vertical plane including the mobile phone 10 and the MFP). The relative distance 242 is a respective distance between the mobile phone 10 and the first to third MFPs 51 to 53. The relative distance 242 includes a horizontal component (a distance between the mobile phone 10 and an MFP when the mobile phone 10 and the location of the MFP relative to the mobile phone 10 are projected on a horizontal plane) and a vertical component (a distance between the mobile phone 10 and the MFP when the mobile phone 10 and the location of the MFP relative to the mobile phone 10 are projected on the vertical plane that is perpendicular to the other vertical plane including the mobile phone 10 and the MFP).

The status information 250 is information indicating MFP device specifications, MFP device statuses, and the like. The status information 250 includes sheet size information 251, print type information 252, and idling print job information 253 on a number of idling print jobs. The sheet size information 251 is information indicating the size of sheets used in the printer 19. The print type information 252 is information indicating whether the printer 19 is set to color printing or to monochrome printing. The idling print job information 253 is information indicating the number of print jobs spooled to the printer 19.

Figure 7:
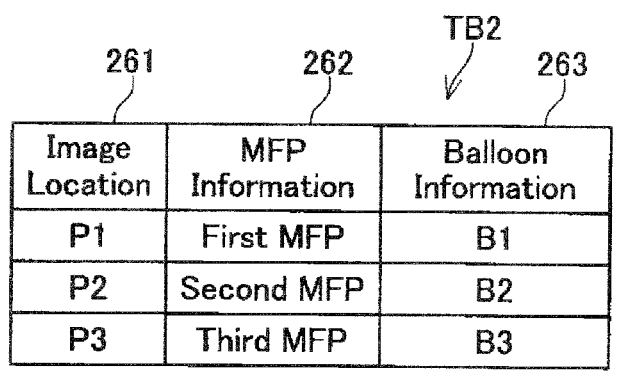
FIG. 7 is a diagram showing an example of stored contents of a display table.

A table memory area 12b, stores a display table TB2. FIG. 7 shows an example of the display table TB2. The display table TB2 is a table that stores the correspondence between balloon information and the MFPs. The display table TB2 stores an image location 261, MFP information 262, and balloon information 263. The image information 261 is information indicating the location in which a partial image is displayed within the display area of the panel 18 (for example: the right side end of the panel 18, or the like). Partial images are the images of the first MFP 51 through the third MFP 53 from among the images of the various objects included in the image taken by the camera unit 27 displayed in the panel 18. The partial images may be images that can be selected by the user. The MFP information 262 is information indicating the correspondence between the image information 261 and the MFP name 231. The balloon information 263 is information indicating the correspondence between the MFP name 231 and the balloon information B1 through B3.

The button input unit 17, the GPS unit 24, the compass unit 25, the acceleration sensor 26, and the camera unit 27 are operation units that receive an operation by the user of the mobile phone 10. The button input unit 17 is integrally configured with the panel 18 as a touch panel. The panel 18 displays various types of function information of the mobile phone 10. The compass unit 25 includes a geomagnetic sensor that acquires an orientation of the mobile phone 10. The acceleration sensor 26 is a sensor that measures an acceleration of the mobile phone 10. The camera unit 27 is a portion that takes an image of a predetermined range and acquires image data with a CCD or the like. The basic program provides an API (Application Programming Interface) that enables the respective programs to acquire information indicating an orientation acquired by the compass unit 25, an acceleration measured by the acceleration sensor 26, image data acquired by the camera unit 27, and the like.

A configuration of the first MFP 51 will be described. The first MFP 51 mainly comprises a CPU 32, a storage unit 33, a transceiver unit 36, a wireless antenna unit 37, a button input unit 38, a panel 39, a modem 40, a telephone line connection unit 41, a printer 19, a scanner 20, a GPS unit 44, and an indicator light 45. These components are configured to be mutually communicable via an input/output port 43.

The CPU 32 controls respective functions according to programs stored in the storage unit 33, various signals transmitted and received via the transceiver unit 36, and the like. The storage unit 33 may be configured by combining a RAM (Random Access Memory), a ROM (Read Only Memory), a flash memory, an HDD (Hard Disk Drive), or the like.

The transceiver unit 36 communicates with the first access point 62 by transmitting and receiving digital signals constituting various data. Communication between the transceiver unit 36 and the first access point 62 is not limited to the wireless communication, and alternatively, a cable communication may be used instead.

The button input unit 38 is one or more keys for executing various functions of the first MFP 51. The button input unit 38 may be integrally configured with the panel 39 as a touch panel. The panel 39 displays various function information of the first MFP 51. The printer 19 is a portion that executes printing. The scanner 20 is a portion that executes scanning. The GPS unit 44 is a portion that acquires location information of the first MFP 51. The indicator light 45 comprises an LED (Light Emitting Diode) or the like and is a portion that notifies various statuses of the first MFP 51 to the user. The modem 40 modulates document data to be transmitted using the facsimile function into a signal transmittable to the telephone network 100 and transmits the signal via the telephone line connection unit 41, and receives an inputted signal from the telephone network 100 via the telephone line connection unit 41 and demodulates the signal into document data. Since configurations of the second MFP 52 and the third MFP 53 are the same as the first MFP 51, a detailed description will be hereby omitted.

A configuration of a first server 71 will be described. The first server 71 mainly comprises a CPU 72, a storage unit 73, and a communication unit 74. The first server 71 is a device that provides its own functions or data to a client device in a network. The CPU 72 controls various functions. The storage unit 73 stores various data. The communication unit 74 communicates various types of information with the mobile phone 10.

The following is an explanation of the configuration of a second server 81. The second server 81 mainly includes a CPU 82, a memory unit 83, and a communication unit 84. The second server 81 is connected to the first access point 62 and the second access point 63 via the Internet 80. The second server 81 can be connected to the mobile phone 10 via the base station 61 and the wireless communication 210. The rest of the configuration of the second server 81 is the same as the configuration of the first server 71 as described above, so the explanation is hereby omitted.

Figure 2:
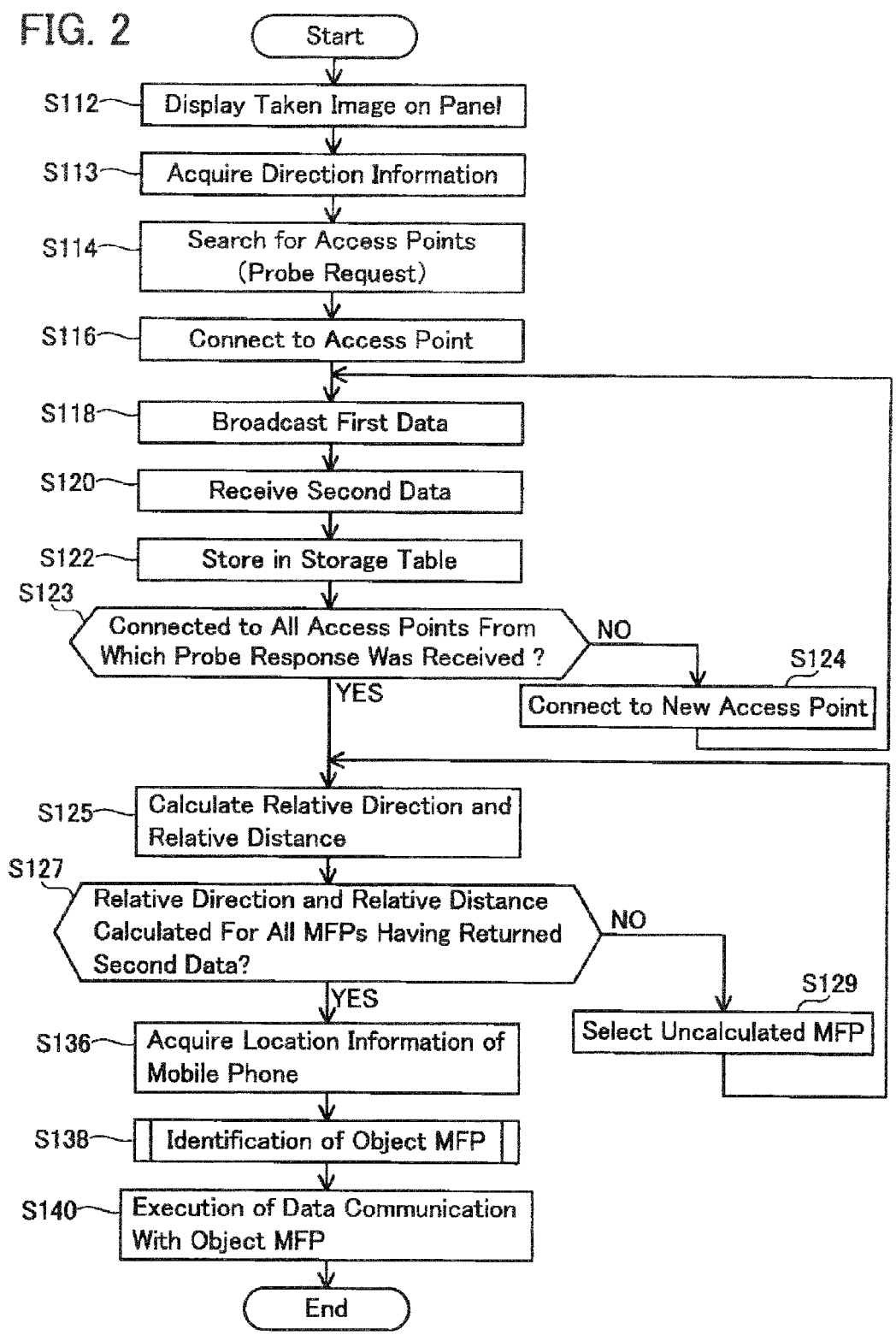
FIG. 2 is a diagram showing a first operational flow chart of a mobile phone.
Figure 3:
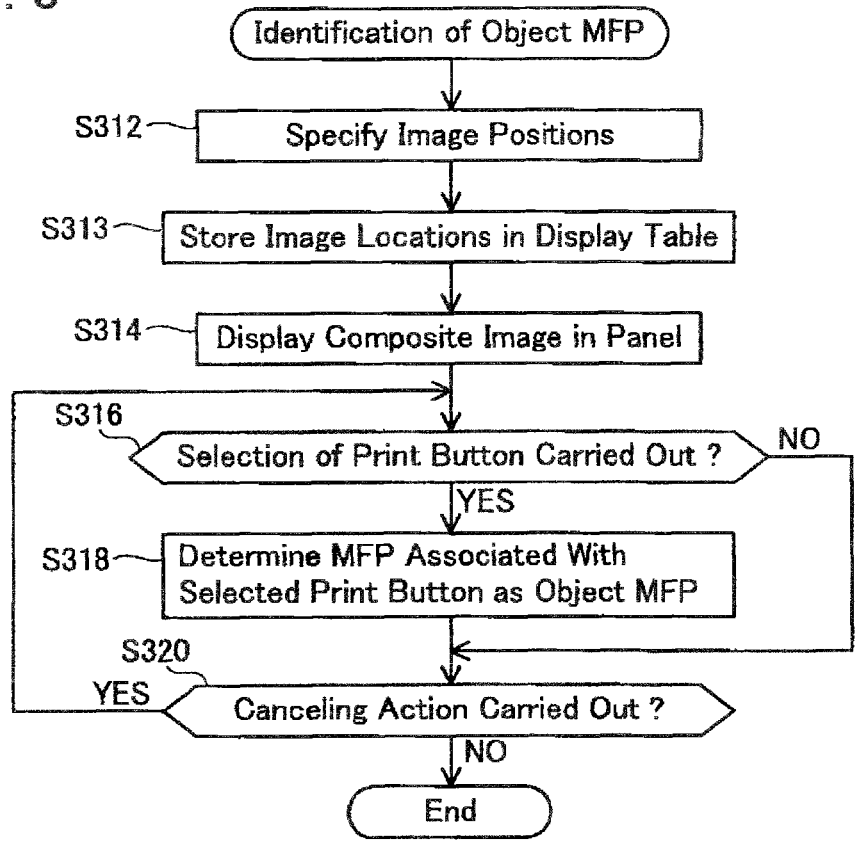
FIG. 3 is a diagram showing a second operational flow chart of the mobile phone.

Operations of the communication system 1 according to a first embodiment will be described with reference to FIGS. 2 to 9. A flow performed by the mobile phone 10 will be described with reference to FIGS. 2 and 3. The flows shown in FIGS. 2 and 3 are executed in response to activation of the communication program 28 of the mobile phone 10. In the first embodiment, when the user points the camera unit 27 at the MFP that the user wishes to set as the data communication object, the mobile phone 10 carries out data communication with the MFP that was shot by the camera unit 27 as the object of data communication. As an example, when the first MFP 51 through the third MFP 53 are disposed in the arrangement indicated in FIG. 5, the operation for pointing the camera unit 27 in the direction of a direction information V1 is explained below.

Figure 5:
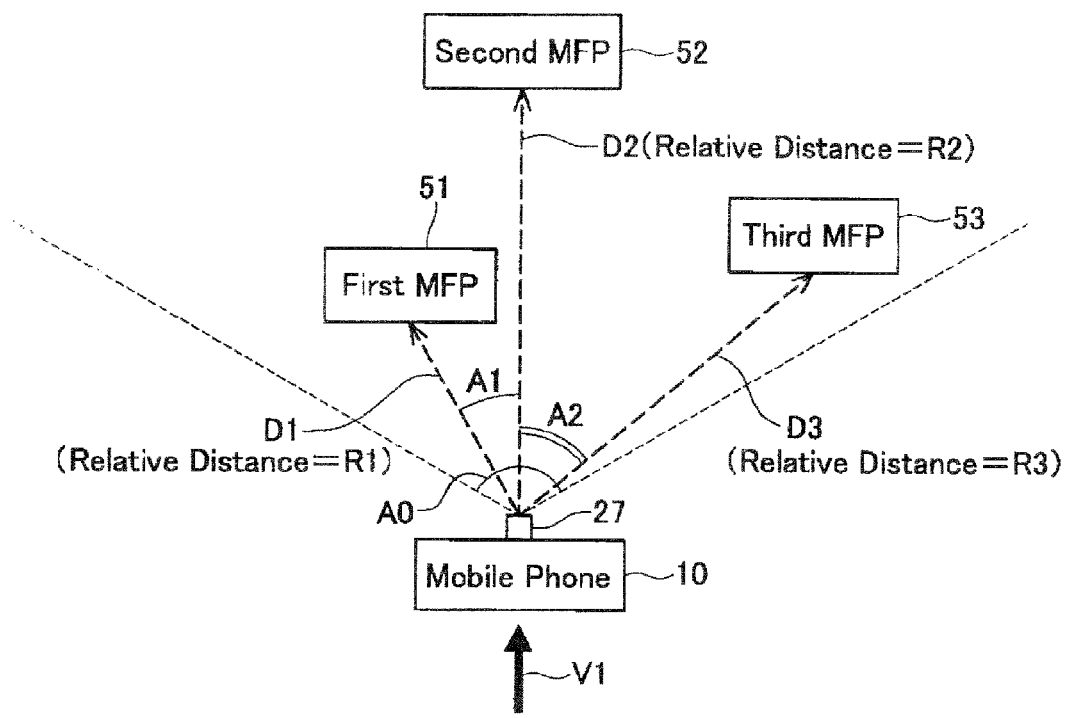
FIG. 5 is a diagram showing an example of an arrangement of MFPs.

In S112 in FIG. 2, when the communication program 28 is started by the user operating the button input unit 17 of the mobile phone 10, operation of the camera unit 27 starts, and an image is shot in real time by the camera unit 27. Then the CPU 11 displays the taken image on the panel 18. In the example of FIG. 5, the image data within the range of an image angle A0 of the camera unit 27 is captured by the camera unit 27. The image angle A0 is the angle that represents the range of view reflecting the image data taken by the camera unit 27.

Figure 8:
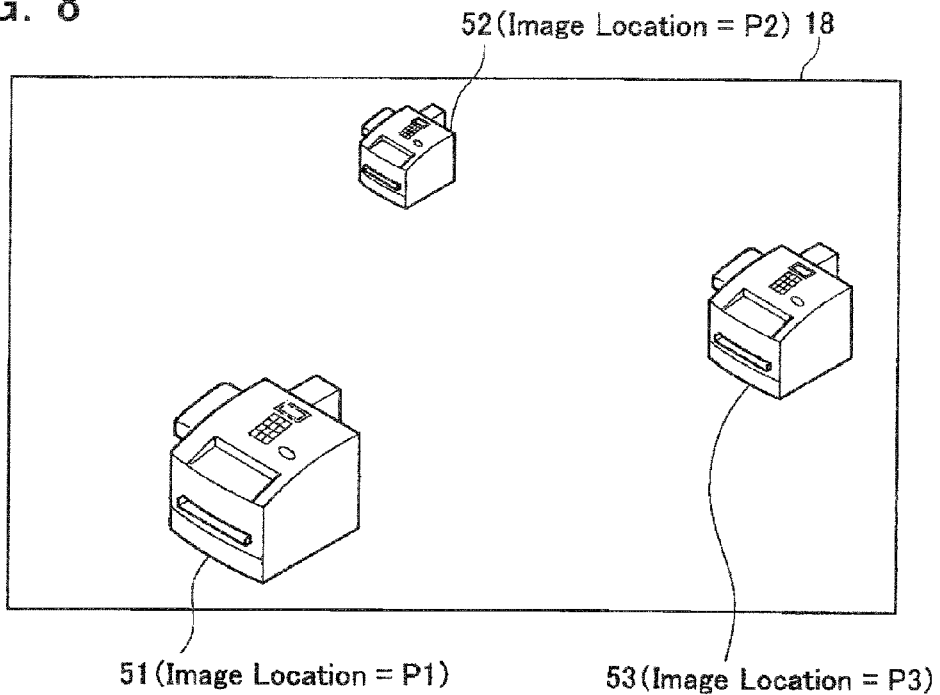
FIG. 8 is a first display example of a panel

FIG. 8 shows an example of taken image shot by the camera unit 27 in the layout in FIG. 5. FIG. 8 shows the attitude of the taken image displayed in the panel 18. As shown in FIG. 8, partial images of the first MFP 51 through third MFP 53 are displayed in the panel 18.

In S113, the CPU 11 uses the API to acquire information indicating the orientation of the mobile phone 10 from the compass unit 25. Using the acquired information, the CPU 11 calculates a direction along a central axis in a thickness direction (an axis which extends in a thickness direction of the mobile phone 10 from the camera unit 27; refer to FIG. 10) of the mobile phone 10 in relation to a location of the camera unit 27 being the reference. In other words, information is calculated which indicates what direction is specified by an operation received from the user by the mobile phone 10 in relation to the location of the camera unit 27 taking an image. The calculated information is stored in the storage unit 12 as the direction information. In other words, the direction information is information that indicates which direction the camera unit 27 is pointed to. In the example of FIG. 5, the direction information V1 is acquired. The direction information includes a horizontal component (a direction in which the tip of the mobile phone 10 on the speaker 3 side is located in relation to a reference location of the compass unit 25 when relative locations of the reference location of the compass unit 25 and a location of the speaker 3 side tip of the mobile phone 10 are projected on a horizontal plane).

Subsequently, in S114, the CPU 11 searches for access points. Specifically, a wireless LAN probe request is broadcasted using the wireless transceiver unit 15. An SSID (Service Set Identifier) included in a probe response returned by an access point (e.g., the first access point 62) in a radio wave range of the wireless transceiver unit 15 is then received and temporarily stored in a work area (a RAM of the storage unit 12 or a buffer) of the CPU 11. In S116, the CPU 11 accesses the first access point 62 or the second access point 63 using the acquired SSID and enters a state where wireless communications 201 or 202 conforming to the wireless LAN infrastructure mode can be performed.

In S118, the CPU 11 uses the wireless transceiver unit 15 to broadcast first data (the first data includes a broadcast address as information indicating a destination of the first data in order to indicate that the first data is being broadcasted) by wireless communication 201 conforming to the wireless LAN infrastructure mode. As a result, wireless clients accessing the first access point 62 (in other words, the wireless clients including the first to third MFPs 51 to 53) receive the first data via the access point. The first data includes identification information (IP address) of the mobile phone 10 in order to indicate a source of the first data. The first data also includes inquiry information (which is also information indicating that the data is first data; as a specific example, an SNMP (Simple Network Management Protocol) Request command) for inquiring whether the wireless clients can adequately process the data that the mobile phone 10 is going to send according to the communication program 28 and can send back the processed data.

In S120, the CPU 11 receives the second data replied from the MFPs connected to the access point. Specifically, the CPU 11 receives data which includes the identification information of the mobile phone 10 in order to indicate the destination, the identification information (IP address) of a relevant MFP in order to indicate the source, reply information for notifying the mobile phone that the data is a reply to the first data, and the status information 250. The reply information is also information indicating that the data is second data; as a specific example, an SNMP Reply command. In S122, the CPU 11 extracts MFP identification information from the second data. Since the second data also includes information indicating a physical location of an MFP, the CPU 11 also extracts information indicating the physical location of the MFP from the second data. The extracted identification information and information indicating the physical location are temporarily stored in the storage table TB1 as an IP address 232 and MFP location information 240 of the relevant MFP.

In S123, the CPU 11 determines whether or not it is connected to all of the access points from which the probe response has been received. If there remain access points that have not connected yet (S123: NO), the CPU 11 advances to S124, and after connecting to the unconnected new access points, returns to S118. On the other hand, if all access points are connected (S123: YES), the CPU 11 advances to S125.

In S125, the CPU 11 calculates a relative direction and a relative distance. The calculation of the relative direction and the relative distance is performed based on the location information of the mobile phone 10 and the MFP location information 240 stored in the storage unit 12. The calculated relative direction and relative distance are temporarily stored in the storage table TB1 as the relative direction 241 and the relative distance 242 of the MFP.

In the example of FIG. 5, a relative direction 241 of the first MFP 51 is "D1", the relative direction 241 of the second MFP 52 is "D2", and the relative direction 241 of the third MFP 53 is "D3", each of which are acquired, and stored in the storage table TB1 (FIG. 6). A relative distance 242 of the first MFP 51 is "R1", the relative distance 242 of the second MFP 52 is "R2", and the relative distance 242 of the third MFP 53 is "R3", each of which is calculated and stored in the storage table TB1 (FIG. 6).

In S127, the CPU 11 determines whether or not the relative direction 241 and the relative distance 242 have been calculated for all MFPs which have returned the second data. If there remain MFPs that have not calculated the relative direction and the relative distance yet (S127: NO), the CPU 11 advances to S129. In S129, the CPU 11 selects an uncalculated MFP and then returns to S125. Accordingly, the relative direction 241 and the relative distance 242 can be acquired for all MFPs which have returned the second data. Subsequently, the CPU 11 advances to S21 (FIG. 2).

On the other hand, in S127, if the calculation has been implemented for all MFPs (S127: YES), the CPU 11 advances to S136. In S136, the CPU 11 acquires the location information of the mobile phone 10 calculated by the GPS unit 24. The acquired location information of the mobile phone 10 is temporarily stored in the storage unit 12.

In S138, the CPU 11 selects an object MFP based on the direction information, the location information of the mobile phone 10, and the location information of the MFPs respectively stored in the storage unit 12. The object MFP is an MFP to become an object of data communication (in other words, the MFP that is to execute the data communication with the mobile phone 10).

Using FIG. 3, the flow for selecting the object MFP is explained. In S312, the CPU 11 specifies the image locations of the partial images of the MFPs on the taken image by the camera unit 27. In other words, the CPU 11 specifies at what location the MFP is displayed on the taken image displayed on the panel 18. The image locations of the partial images may be represented as, for example, coordinate data on the taken image.

The following is an explanation of a specific method of specifying the image locations of the partial images. As an example, a method of specifying the image locations of the partial images based on the angular difference between the relative directions and the direction information is explained using FIGS. 5 and 8. In the example in FIG. 5, the direction information V1 and the relative direction 241 of the second MFP 52="D2" coincide, there is no angular difference. Therefore, as shown in FIG. 8, the image location of the partial image of the second MFP 52 is specified as the image location 261="P2" (center of the panel 18). In the example in FIG. 5, there is an angular difference A1 between the direction information V1 and the relative direction 241 of the first MFP 51="D1". Therefore, as shown in FIG. 8, the image location of the partial image of the first MFP 51 is specified as the image location 261="P1" (on the left side of the panel 18). In the example in FIG. 5, the direction information V1 and the relative direction 241 of the third MFP 53="D3" have an angular difference A2. The angular difference A2 is larger than A1. Therefore, as shown in FIG. 8, the image location of the partial image of the third MFP 53 is specified as the image location 261="P3" (right side and end portion of the panel 18).

In S313, the CPU 11 stores the image locations of the specified partial images in the display table TB2 corresponding to the MFPs. In the case of the example of arrangement of the first MFP 51 through third MFP 53 shown in FIG. 5, the image locations 261 of the partial images are stored in the display table TB2, as shown in the example in FIG. 7.

In S314, the CPU 11 generates a composite image with the balloon information incorporated at the locations corresponding to the image locations of the partial images. Then the generated composite image is displayed in the panel 18. The balloon information is a type of display format used in Graphical User Interfaces (GUIs). The balloon information displays various types of information regarding the MFPs.

Figure 9:
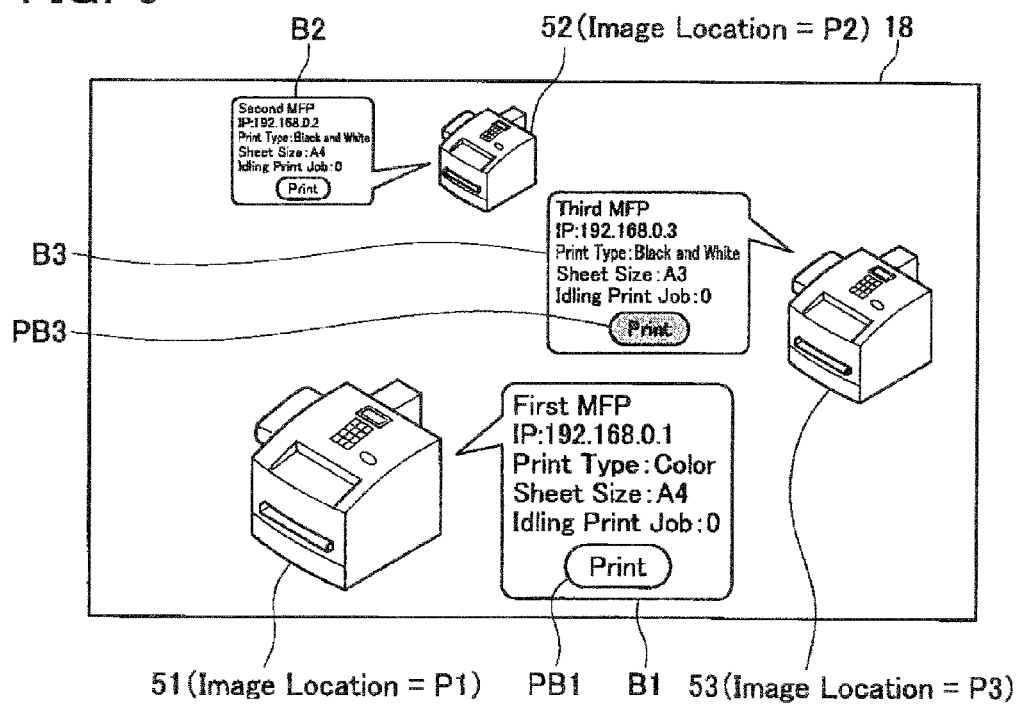
FIG. 9 is a second display example of the panel

FIG. 9 shows an example of the composite image displayed in the panel 18. In the example of FIG. 9, a case where the "locations corresponding to the image locations of the partial images" are adjacent to the image locations of the partial images is explained. At the location corresponding to the image location 261="P1" of the partial image of the first MFP 51 (on the right side of P1, in a location that does not overlap with the partial image of the first MFP 51) the balloon information B1 is displayed providing information regarding the first MFP 51. In the example in FIG. 9, the balloon information B1 displays the MFP name 231, the IP address 232, the print type information 252, the sheet size information 251, the idling print job information 253 on the number of idling print jobs, and a print button PB1. The print button PB1 is a button for inputting the instruction to print at the first MFP 51.

Likewise, at the location corresponding to the image location 261="P2" of the partial image of the second MFP 52 (on the left side of P2, in a location that does not overlap with the partial image of the second MFP 52), the balloon information B2 is displayed. At the location corresponding to the image location 261="P3" of the partial image of the third MFP 53 (on the left side of P3, in a location that does not overlap with the partial image of the third MFP 53), the balloon information B3 is displayed.

In S314, the CPU 11 displays the balloon information larger the shorter the relative distance 242. In the example in FIG. 5, the relative distance 242="R2" is the furthest, and the relative distance becomes closer in the order "R3", "R1". Therefore, as shown in the example in FIG. 9, the balloon information is displayed progressively larger in the order B2, B3, B1.

In S314, the CPU 11 displays the balloon information for MFPs that cannot carry out wireless communication in a different form from the balloon information for MFPs that can carry out wireless communication. An example of MFP that cannot carry out wireless communication can be an MFP that is connected to a network that is different from the network currently connected to. For example, in the communication system 1 shown in FIG. 1, in a case where the mobile phone 10 is connected to the first access point 62 using the wireless communication 201, wireless communication with the first MFP 51 and the second MFP 52 is possible. However, wireless communication with the third MFP 53 which belongs to the second access point 63 is not possible. In this case, as shown in FIG. 9, the print button PB3 included in the balloon information B3 of the third MFP 53 which cannot carry out wireless communication is displayed grayed out (the button is displayed in gray color, indicating the state that the button cannot be selected). As a result MFPs with which data communication is not possible can be visually confirmed on the panel 18, so the convenience of the user is increased.

In S316, the CPU 11 determines whether or not selection of the print button has been carried out. Selection of the print button may be carried out by directly touching the print button in cases where the panel 18 is a touch panel. Or, selection of the print button may be carried out by operating the button input unit 17. If selection of the print button has not been carried out (S316: NO) the CPU 11 advances to S320, and if it has been carried out (S316: YES) the CPU 11 advances to S318.

In S318, the CPU 11 specifies the balloon information associated with the selected print button. Then, using the display table TB2 (FIG. 7), the CPU 11 determines the MFP name 231 corresponding to the specified balloon information 263. As a result, the MFP associated with the print button selected by the user is determined to be the object MFP.

In S320, the CPU 11 determines whether or not a canceling action has been carried out within a predetermined period of time. The canceling action is an action for canceling specification of the MFP. The canceling action may be carried out by various actions. For example, within a predetermined period of time after carrying out selection of the print button, there may be an action that moves the object MFP outside the range of the image angle A0, by changing the orientation of the camera unit 27. As a result, it is possible to cancel the printing by moving the MFP, that was to execute the printing, out of the frame of the panel 18. The canceling action may be carried out by an action of pressing a cancel button on the button input unit 17, or an action of touching an arbitrary location on the panel 18. When the canceling action has been carried out (S320: YES), the CPU 11 returns to S316. On the other hand, when the canceling action has not been carried out (S320: NO), the flow is terminated, and the CPU 11 advances to S140 (FIG. 2).

In S140, the CPU 11 executes data communication with the object MFP. Specifically, the CPU 11 executes data communication in which the CPU 11 reads out MFP identification information 230 (IP address) of the object MFP from the storage table TB1, causes the wireless transceiver unit 15 to transmit data including the IP address of the object MFP to be indicated as the destination as transmission data to the object MFP, and causes the wireless transceiver unit 15 to receive data including the IP address of the object MFP (in other words, data transmitted by the object MFP) as reception data. The IP address of the object MFP is information for identifying a sender of the data. Various types of data are conceivable as the data handled in the data communication. For example, processing data may be transmitted to the object MFP by the wireless transceiver unit 15 to have the object MFP execute predetermined processing thereon. Specifically, print data may be transmitted to the object MFP by the wireless transceiver unit 15 to have the object MFP perform printing of the print data using the printer 19. A scanning instruction may be transmitted to the object MFP by the wireless transceiver unit 15 to have the wireless transceiver unit 15 receive scan data generated by the object MFP using the scanner 20 from the object MFP. An IP phone instruction may be transmitted to the object MFP by the wireless transceiver unit 15 to have the object MFP execute a call or a facsimile communication to a phone device or a facsimile device existing on the other end of the telephone line via the modem 40 of the object MFP and the telephone line connection unit 41.

Figure 4:
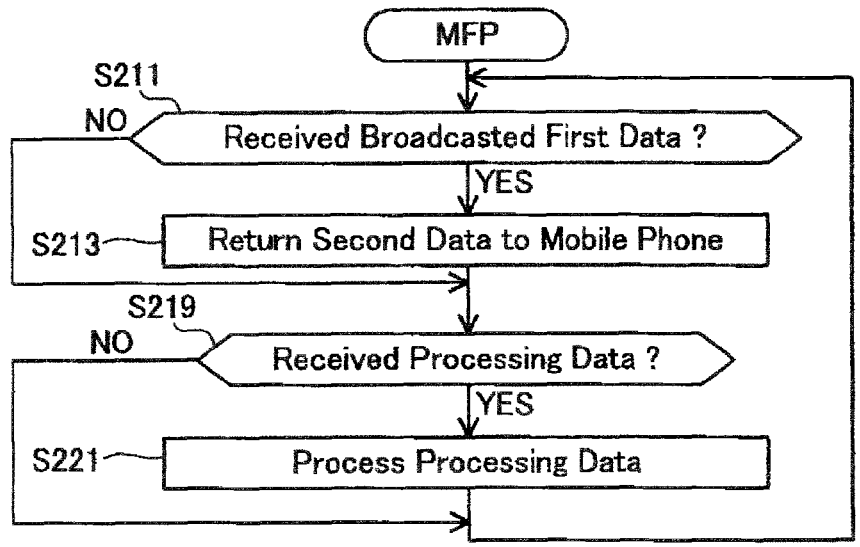
FIG. 4 is a diagram showing an operational flow chart of an MFP.

Flows performed at the first to third MFPs 51 to 53 will be described with reference to FIG. 4. In S211, the CPU 32 determines whether or not first data broadcasted from the mobile phone 10 has been received (specifically, the CPU 32 determines whether or not data has been received which includes a broadcast address as information indicating a destination and which includes information indicating that the data is first data). When not received (S211: NO), the CPU 32 advances to S219, and when received (S211: YES), the CPU 32 advances to S213. In S213, the CPU 32 returns the second data to the mobile phone 10.

In S219, the CPU 32 determines whether or not processing data such as print data has been received from the mobile phone 10. When not received (S219: NO), the CPU 32 returns to S211, and when received (S219: YES), the CPU 32 advances to S221. In S221, the CPU 32 executes processing on the processing data. For example, when the processing data is print data, processing is executed for printing the print data using the printer 19. The CPU 32 then returns to S211.

As a specific example of operations of the communication system 1 according to the first embodiment, a case will be described in which first to third MFPs 51 to 53 are arranged in a form shown in FIG. 5. A case will be described in which the first MFP 51 is selected as an object MFP. A case will be described in which print data is transmitted to the object MFP.

The flow shown in FIG. 2 is started in response to an activation of the communication program 28 by an operation of the button input unit 17 of the mobile phone 10 by the user. When the user points the camera unit 27 at the first MFP 51 through third MFP 53, as shown in FIG. 8, partial images of the first MFP 51 through third MFP 53 are displayed in the panel 18 (S112). Subsequently, the mobile phone 10 acquires direction information (S113). Because a case has been described in which the user points the camera unit 27 at the first MFP 51, the direction information V1 is acquired as shown in FIG. 5. The mobile phone 10 then accesses the first access point 62 and enters a state where wireless communication 201 conforming to the wireless LAN infrastructure mode can be performed (S116). Next, the mobile phone 10 broadcasts the first data to the first to third MFPs 51 to 53 (S118). Subsequently, the first to third MFPs 51 to 53 receive the first data (S211: YES) and return second data to the mobile phone 10 (S213). The mobile phone 10 receives the second data from the first to third MFPs 51 to 53 (S120: YES) and stores the second data in the storage table TB1 of the storage unit 12 (S122).

Next the mobile phone 10 carries out infrastructure mode wireless communication 202 with the second access point 63 (S116). The mobile phone 10 broadcasts first data to the third MFP 53 (S118), and stores second data received from the third MFP 53 in the storage table TB1 (S120, S122). Therefore, as shown in FIG. 6, MFP identification information 230, MFP location information 240, and status information 250 are stored in the storage table TB1.

The mobile phone 10 calculates the relative direction and the relative distance for each of the first to third MFPs 51 to 53 (S125). As a result, as shown in FIG. 5, the relative direction D1 of the first MFP 51, the relative direction D2 of the second MFP 52, and the relative direction D3 of the third MFP 53 are calculated. A relative distance R1 of the first MFP 51, a relative distance R2 of the second MFP 52, and a relative distance R3 of the third MFP 53 are respectively calculated. Subsequently, as shown in FIG. 6, the calculated relative directions and relative distances are stored in the storage table TB1 as the relative direction 241 and the relative distance 242.

Once the relative direction and the relative distance have been calculated for all of the first to third MFPs 51 to 53 (S127: YES), the mobile phone 10 acquires location information of the mobile phone calculated by the GPS unit 24 (S136).

The mobile phone 10 specifies the image locations of the partial images of the first MFP 51 through third MFP 53 on the taken image taken by the camera unit 27 (S312). Then, as shown in FIG. 9, the mobile phone 10 displays the composite image in which the balloon information is incorporated onto the taken image on the panel 18 (S314). The print button PB1 is selected by the user touching the print button PB1 (S316: YES). Using the display table TB2 (FIG. 7), the mobile phone 10 specifies the first MFP 51 that is associated with the print button PB1 as the object MFP (S318). The mobile phone 10 executes data communication with the first MFP 51, and transmits the print data (S140). The first MFP 51 receives the print data (S219: YES), and using the printer 19 prints the print data (S221). Then the flow terminates.

The following is an explanation of the effect of the communication system 1 according to the explanatory example of the first embodiment, as explained above. In the communication system 1, by inputting the partial image of the MFP that the user wishes to select into the mobile phone 10 using the camera unit 27, the MFP can be selected as the destination. As a result, the user no longer will need to know or check in advance the identification information for the MFP that the user wishes to communicate with, and also, a manual input of the identification information to the mobile phone 10 by the user will no longer be necessary. Therefore the object MFP can be selected by a simple procedure.

Also in the communication system 1, when the balloon information is displayed, the balloon information is displayed larger the shorter the relative distance 242. As a result, by using not only the relative direction 241, but by using it in combination with the parameter relative distance 242, the image locations of the partial images of the MFPs on the panel 18 can be more easily determined.

With the communication system 1, when deciding on the object MFP, in a case where a plurality of MFPs exists in the direction to which the user points the camera unit 27, the balloon information indicating the MFPs are displayed on the panel 18 to have the user select balloon information. In other words, even when a single object MFP cannot be decided by using only the relative direction 241, the single appropriate object MFP can be decided.

A modified example of the first embodiment will now be described. The modified example of the first embodiment uses a scheme that uses an ad-hoc mode wireless communication. In the first embodiment, the mobile phone 10 communicates with the first MFP 51 and the second MFP 52 via the first access point 62 by wireless communication 201 conforming to the wireless LAN infrastructure mode. The mobile phone 10 communicates with the third MFP 53 via the second access point 63 by wireless communication 202. Alternatively, a configuration may be adopted in which the mobile phone 10 directly communicates with the first to third MFPs 51 to 53 by wireless communication 200 conforming to Bluetooth (registered trademark). In this case, the first to third MFPs 51 to 53 are in states capable of responding to the search while conforming to Bluetooth.

The operational flow of the modified example is the same as the operational flow of the communication system according to the first embodiment (FIGS. 2 and 3). However, in order to adapt the flow of FIG. 2 to the operation of the communication system according to the modified example, S114 may be replaced with "Search for an MFP that can communicate". S116 may be replaced with "Connect to MFP". S123 may be replaced with "Connected to all MFPs that received probe response?" S124 may be replaced with "Connect to new MFP".

The following is an explanation of a specific example of the operation of the communication system according to the modified example. As an example, a case in which the first MFP 51 through third MFP 53 are disposed as shown in FIG. 5 and the first MFP 51 is selected as the object MFP is explained.

The flow of FIG. 2 starts when the communication program 28 starts up. As shown in FIG. 8, partial images of the first MFP 51 through third MFP 53 are displayed in the panel 18, by the user operating the camera unit 27 (S112). The mobile phone 10 searches for MFPs that can connect in ad-hoc mode, and detects the first MFP 51 through third MFP 53 (S114). The mobile phone 10 first connects to the first MFP 51 in ad-hoc mode wireless communication 201a, (S116). Then, the mobile phone 10 transmits the first data to the first MFP 51 (S118), and the first MFP 51 returns the second data (S213). The mobile phone 10 receives the second data, and stores it in the storage table TB1 (S122).

Not all the MFP are connected (S123: NO), so the mobile phone 10 cuts the wireless communication with the first MFP 51, and connects with the second MFP 52 by wireless communication (S124). Then, the mobile phone 10 transmits the first data to the second MFP 52 (S118), and the second MFP 52 returns the second data (S213). The mobile phone 10 receives the second data, and stores it in the storage table TB1 (S122).

The mobile phone 10 still has not connected to the third MFP 53 (S123: NO), so the mobile phone 10 cuts the wireless communication with the second MFP 52, and connects to the third MFP 53 by wireless communication (S124). Then, the mobile phone 10 transmits the first data to the third MFP 53 (S118), and the third MFP 53 returns the second data (S213). The mobile phone 10 receives the second data, and stores it in the storage table TB1 (S122). As a result, the second data can be received from the first MFP 51 through third MFP 53.

The mobile phone 10 calculates the relative direction 241 and the relative distance 242 for each of the first MFP 51 through third MFP 53 (S125). The mobile phone 10 acquires the direction information using the compass unit 25 (S134). Also the mobile phone 10 acquires location information of the mobile phone 10 using the GPS init 24 (S136). The mobile phone 10 determines the image locations of the partial images of the first MFP 51 through third MFP 53 on the taken image taken by the camera unit 27 (S312).

In S314, the composite image that incorporates the balloon information onto the taken image is displayed on the panel 18 (S314). At the time of S314, the mobile phone 10 is connected to the third MFP 53 using wireless communication. Therefore, the status is that wireless communication with the third MFP 53 is possible, but wireless communication with the first MFP 51 and second MFP 52 is not possible. Therefore, the print buttons PB1 and PB2 are displayed on the panel 18 in the grayed out state.

As explained above, in the communication system according to the modified example of the first embodiment, it is possible to form an ad-hoc network. In the ad-hoc network, the first MFP 51 through third MFP 53 can be connected to the mobile phone 10, without going through the first access point 62 and the second access point 63. Therefore, it is possible to construct a network in places that do not have infrastructure such as the first access point 62 and the second access point 63.

Figure 11:
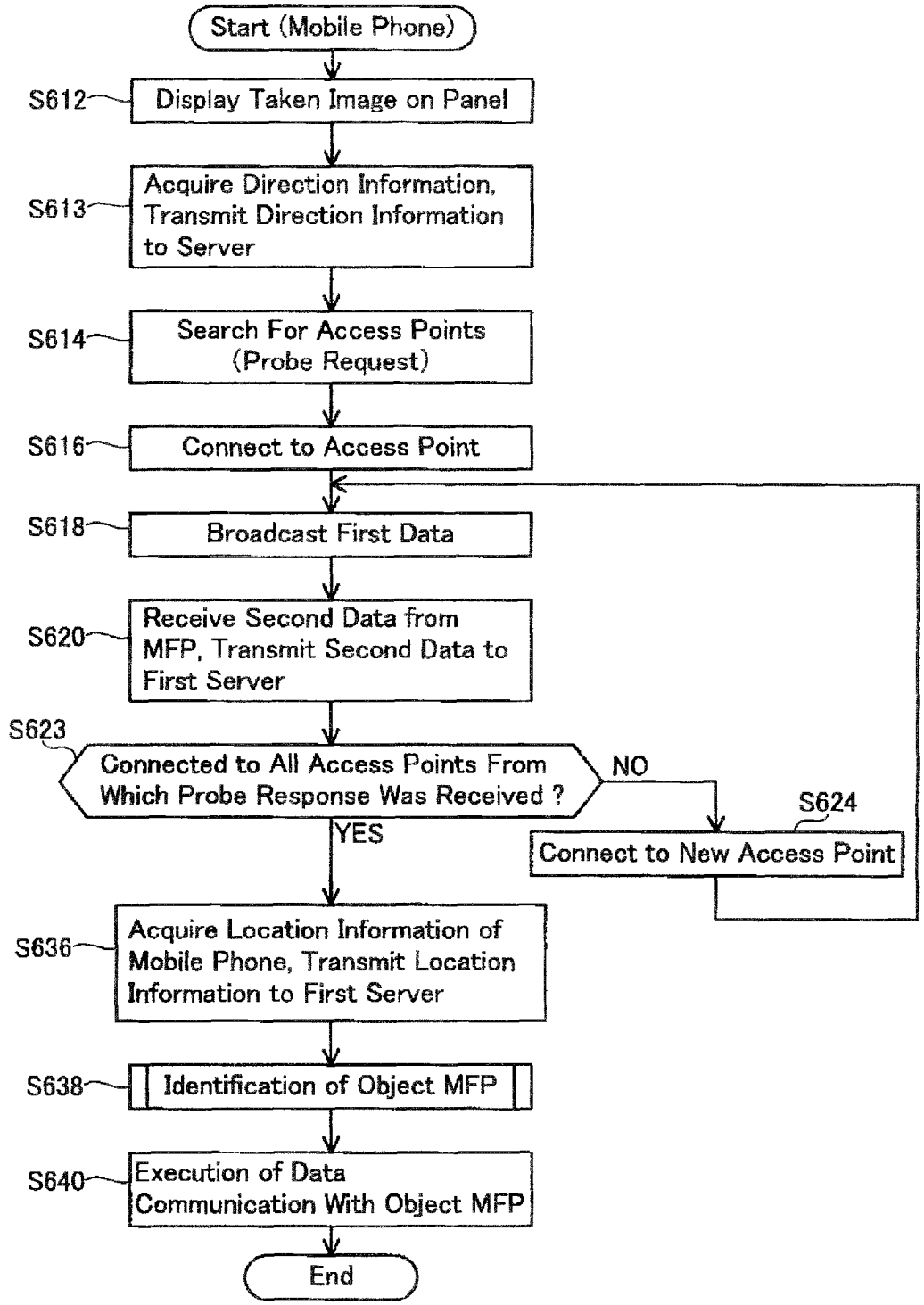
FIG. 11 is a diagram showing a third operational flow chart of the mobile phone.
Figure 12:
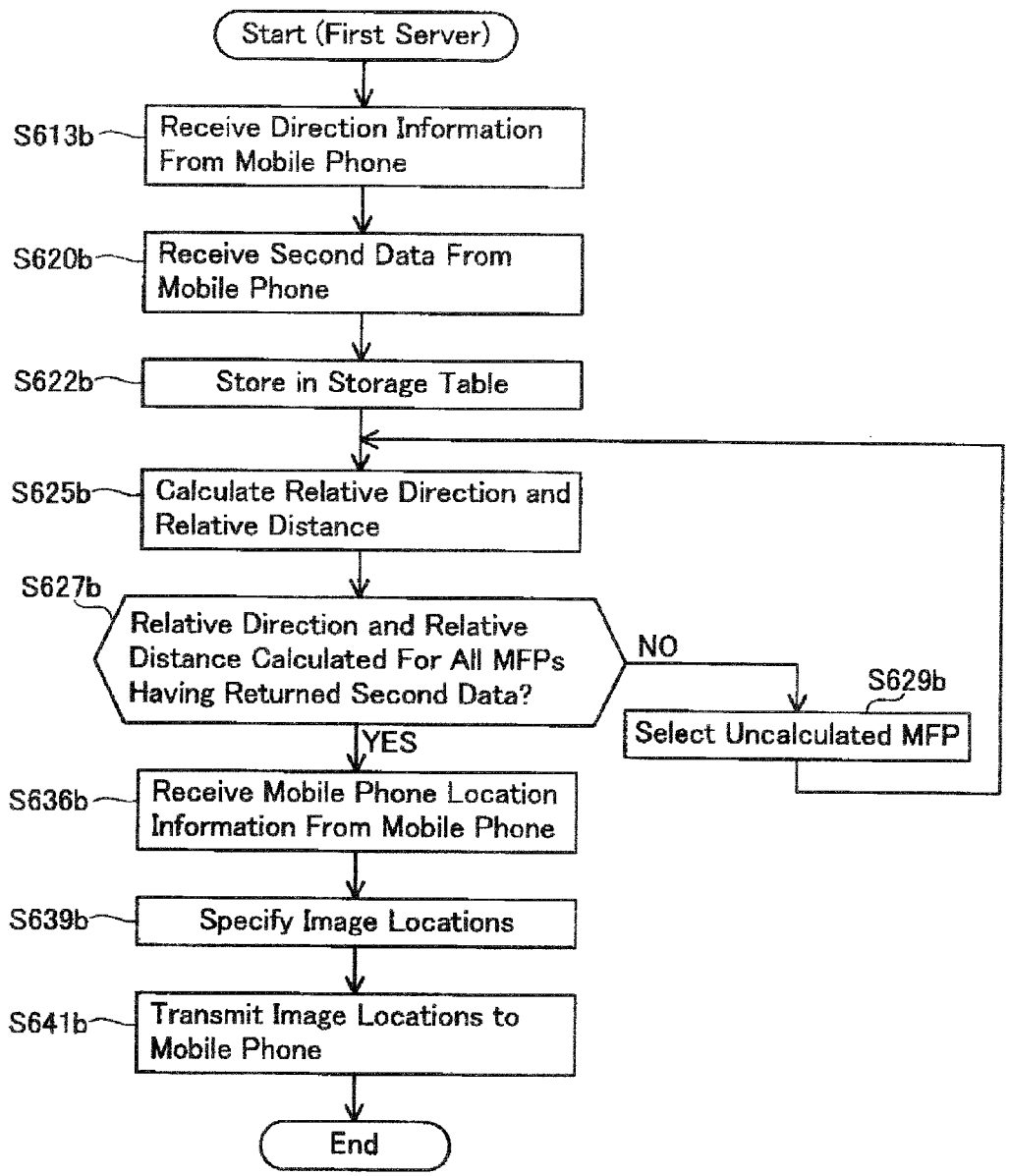
FIG. 12 is a diagram showing a first operational flow chart of a server.

A second embodiment will now be described. In the second embodiment, a first server 71 is used in the communication system 1 illustrated in FIG. 1. Processing that is performed by the mobile phone 10 in the first embodiment is divided in the second embodiment between a server and a mobile phone 10. A storage unit 73 of the first server 71 stores a storage table TB1. Operations of the communication system 1 according to the second embodiment will now be described with reference to FIGS. 11 and 12. FIG. 11 show flows performed by the mobile phone 10. FIG. 12 show flows performed by the first server 71.

The following is an explanation of the flow carried out by the mobile phone 10. The flow in FIG. 11 starts in response to the user starting up the communication program 28 in the mobile phone 10. In S612, the CPU 11 of the mobile phone 10 displays the taken image on the panel 18. In S613, the CPU 11 acquires direction information, and causes the wireless transceiver unit 15 to carry out a transmission process to the first server 71. In S614, the CPU 11 searches for access points. In S616, the CPU 11 connects to the first access point 62 or the second access point 63 in infrastructure mode wireless communication. In S618, the CPU 11 broadcasts the first data using the wireless transceiver unit 15. In S620, the CPU 11 causes the wireless transceiver unit 15 to carry out a process for transmitting the second data received from the MFP to the first server 71, via the first access point 62 and the Internet 70.

In S623, the CPU 11 determines whether or not it is connected to all access points that have received a probe response. If all access points are not connected (S623: NO), the CPU 11 advances to S624, and after connecting to the unconnected new access points, returns to S618. On the other hand, if all access points are connected (S623: YES), the CPU 11 advances to S636.

In S636, the CPU 11 causes the GPS unit 24 to acquire the location information of the mobile phone 10, and causes the wireless transceiver unit 15 to transmit the location information to the first server 71. In S638, the CPU 11 determines the object MFP. The content of the flow to determine the object MFP in S638 is the same as the content of steps S314 through S320 in the flow in FIG. 3, so detailed explanation is omitted here. In S640, the CPU 11 carries out data transmission with the object MFP. Then, the flow carried out by the mobile phone 10 terminates.

The following is an explanation of the flow carried out by the first server 71, using FIG. 12. In S613b,, the CPU 72 receives the direction information from the mobile phone 10. In S620b,, the CPU 72 of the first server 71 receives the second data from the mobile phone 10. In S622b,, the CPU 72 extracts the MFP location information 240, the MFP identification information 230, and status information from the second data. The extracted information is stored in the storage table TB1 of the storage unit 73. In S625b,, the CPU 72 calculates the relative direction 241 and the relative distance 242.

In S627b,, the CPU 72 determines whether or not the relative direction 241 and the relative distance 242 have been calculated for all MFPs. If they have not been calculated for all MFPs (S627b:, NO), the CPU 72 advances to S629b,, and after selecting the uncalculated MFPs, returns to S625b. On the other hand, in S627b,, if they have been calculated for all MFPs (S627b:, YES), the CPU 72 advances to S634b. In S636b,, the CPU 72 receives the mobile phone 10 location information from the mobile phone 10. In S639b, the CPU 72 specifies the image locations of the partial images of the MFPs on the taken image taken by the camera unit 27. In S641b, the CPU 72 causes the communication unit 74 to transmit the specified image locations to the mobile phone 10. Then, the flow carried out by the first server 71 terminates. The content of the detailed operations in each step in FIGS. 11 and 12 is the same as the content explained for the first embodiment, so the detailed explanation is omitted here.

As explained above, in the communication system 1 according to the explanatory example of the second embodiment, a part of the process to acquire the relative direction and the relative distance, a part of the process to specify the image locations of the partial images, a part of the process to determine the object MFP, and so on, can be carried out by the first server 71. Therefore, it is possible to reduce the processing load on the mobile phone 10 or the first MFP 51 through third MFP 53.

Figure 13:
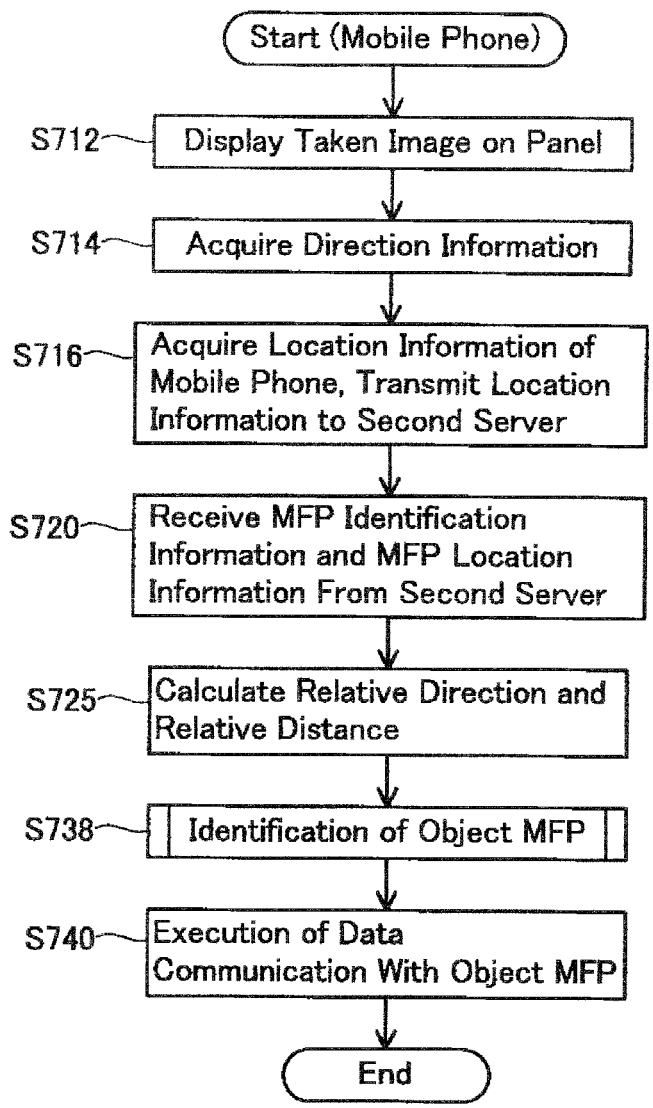
FIG. 13 is a diagram showing a fourth operational flow chart of the mobile phone.
Figure 14:
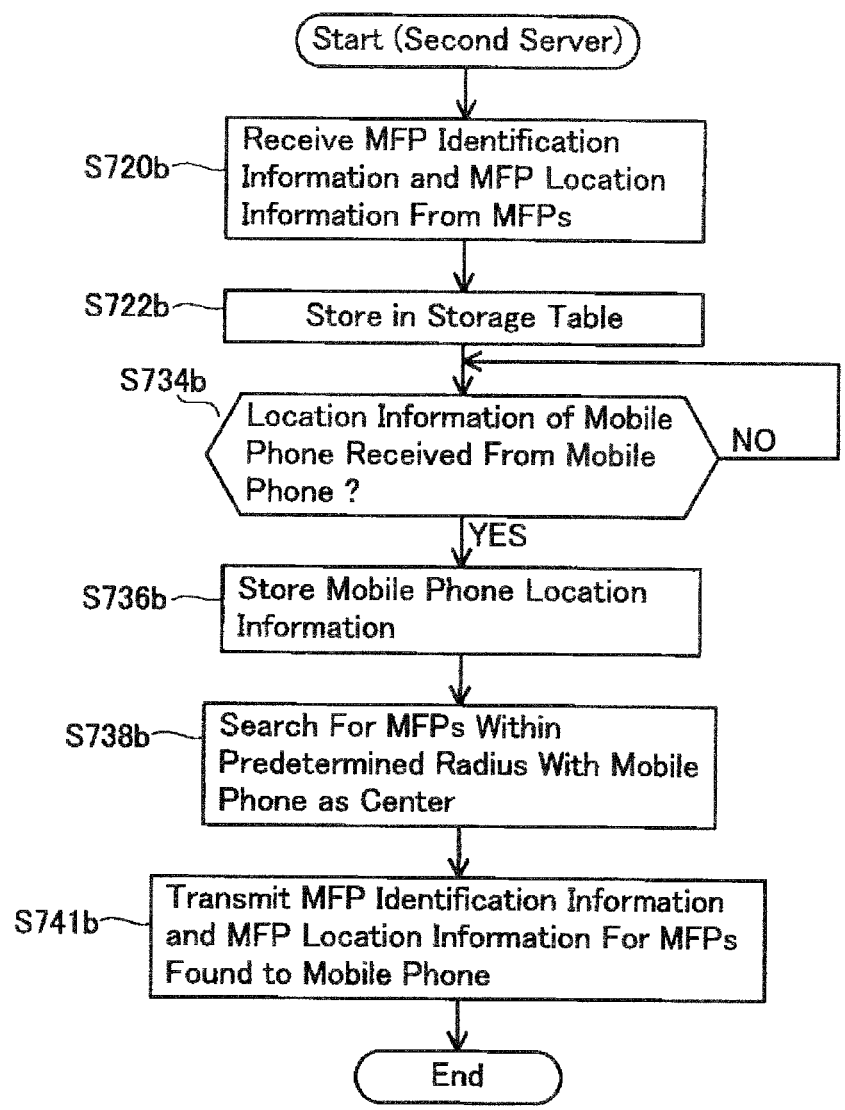
FIG. 14 is a diagram showing a second operational flow chart of the server.

The following is an explanation of a third embodiment. The third embodiment is a format that uses the second server 81 in the example of communication system 1 shown in FIG. 1. The processing carried out by the mobile phone 10 in the first embodiment is divided in the third embodiment between the second server 81 and the mobile phone 10. The following is an explanation of the operation of the communication system 1 in the third embodiment, using the flow charts of FIGS. 13 and 14. FIG. 13 is the flow carried out by the mobile phone 10. FIG. 14 is the flow carried out by the second server 81.

The following is an explanation of the flow carried out by the mobile phone 10. The flow of FIG. 13 starts in response to the user starting up the communication program 28 on the mobile phone 10. In S712, the CPU 11 of the mobile phone 10 displays the taken image on the panel 18. In S714, the CPU 11 acquires the direction information. In S716, the CPU 11 acquires the location information of the mobile phone 10 using the GPS unit 24. Then, the CPU 11 causes the wireless transceiver unit 15 to transmit the location information of the mobile phone 10 to the second server 81, via the mobile phone transceiver unit 22, the wireless communication 210, and the base station 61.

In S720, the CPU 11 receives, from the second server 81, MFP identification information 230 and MFP location information 240 for the MFPs located around the mobile phone 10. The detailed operation contents of each of the steps of S725, S738, and S740 are the same as the contents of each of the steps of S125, S138, and S140 (FIG. 2) as explained for the first embodiment, so detailed explanation is omitted here.

The following is an explanation of the flow carried out by the second server 81, using FIG. 14. In S720b, the CPU 82 of the second server 81 receives the MFP identification information 230 and the MFP location information 240 from the first MFP 51 through third MFP 53. In S722b, the CPU 82 stores the MFP identification information 230 and the MFP location information 240 in the storage table TB1 of the storage unit 83. As a result, the MFP identification information 230 and the MFP location information 240 for each MFP is uploaded to the second server 81. The operation of uploading to the second server 81 may be carried out by the user, or it may be periodically carried out automatically.

In S734b, the CPU 82 determines whether or not the location information of the mobile phone 10 has been received from the mobile phone 10. If it has not been received (S734b: NO), the CPU 82 returns to S734b, and waits, and if it has been received (S734b: YES), the CPU 82 advances to S736b. In S736b, the CPU 82 stores the received location information for the mobile phone 10 in the storage unit 83.

In S738b, the CPU 82 searches for MFPs within a predetermined radius with the mobile phone 10 as the center, based on the location information of the mobile phone 10 and the MFP location information 240.

In S741b, the CPU 82 reads from the storage unit 83 the MFP identification information 230 and the MFP location information 240 for the MFPs found. Then, the CPU 82 causes the communication unit 84 to transmit to the mobile phone 10 the MFP identification information 230 and the MFP location information 240 that was read.

As explained above, in the communication system 1 according to the explanatory example of the third embodiment, the process of acquiring the MFP identification information 230 and the MFP location information 240 for the MFPs located around the mobile phone 10 can be carried out by the second server 81. Therefore, it is possible to reduce the processing load on the mobile phone 10 and the first MFP 51 through third MFP 53.

Figure 15:
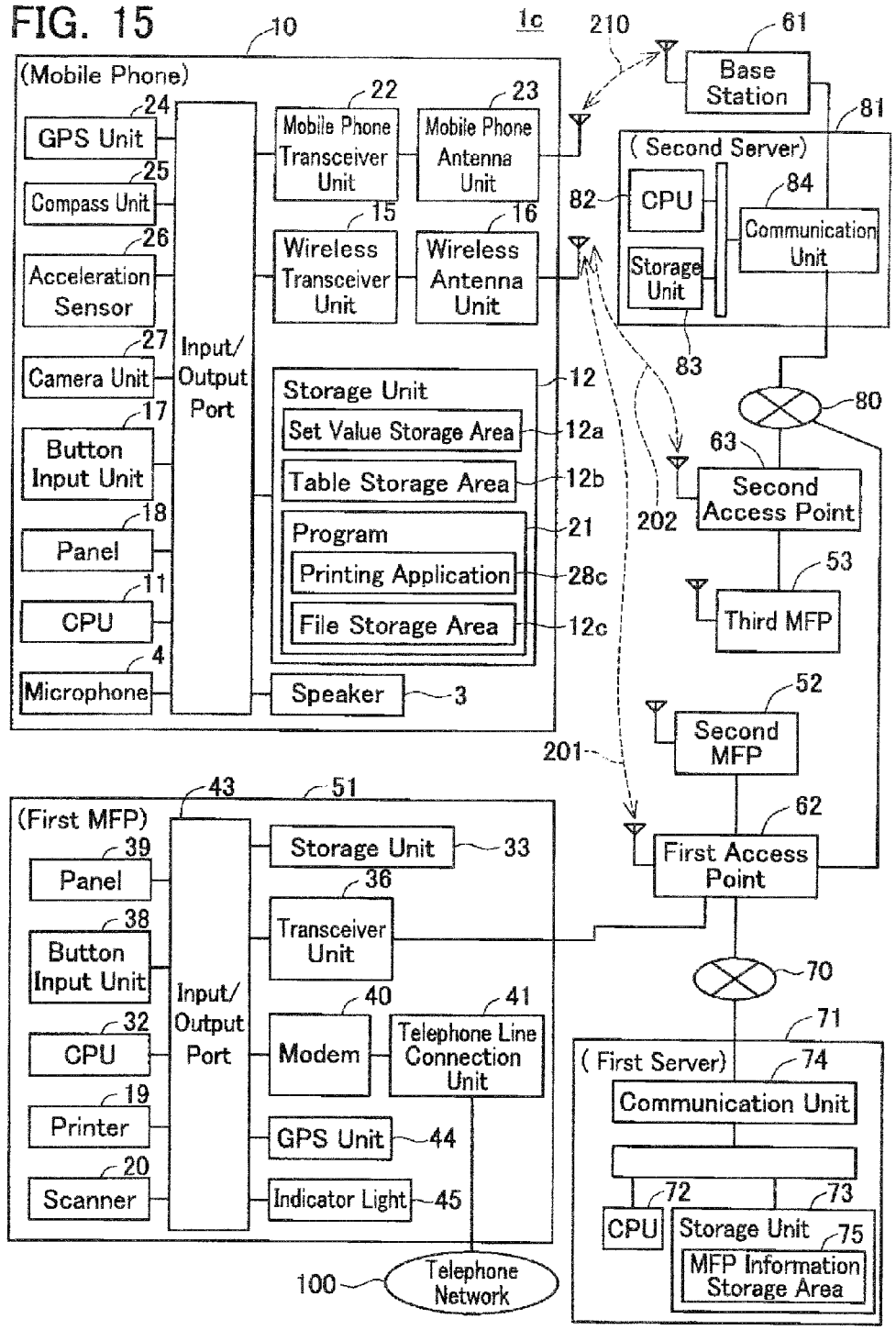
FIG. 15 is a block diagram of a communication system 1c.

The following is an explanation of a fourth embodiment. FIG. 15 shows a block diagram of a communication system 1c, exemplified as the fourth embodiment of the present application. The storage unit 12 stores a program 21. The program 21 includes a printing application 28c, and the like. The printing application 28c, is a program which causes the CPU 11 to execute an operational flow of the communication system 1c, which will be described later.

The storage unit 12 comprises a set value storage area 12a, a table storage area 12b, and a file storage area 12c. The set value storage area 12a, stores a taken image update flag, a predetermined period, a direction information, a location information, and the like which will be described later. The taken image update flag may be stored in advance in the set value storage area 12a, by the user. The table storage area 12b, stores a storage table TB1. FIG. 19 shows an example of the storage table TB1. The storage table TB1 assigns a memory number 220 to each of the first to third MFPs 51 to 53, and associatively stores MFP identification information 230, MFP location information 240, a relative direction 241, a relative distance 242, and specifications information 250c.

"Specifications information" herein means information describing the specification of the MFP. Specifically, the specifications information 250c, includes model number information 251c of the MFPs and file information 252c, which represents file formats corresponding to the MFPs. Examples of file formats include PDF (Portable Document Format), XPS (XML Paper Specification) and JPEG (Joint Photographic Experts Group). The rest of the configuration of the storage table TB1 shown in FIG. 19 is the same as the storage table TB1 shown in FIG. 6, so the explanation is hereby omitted.

Figures 20, 21:
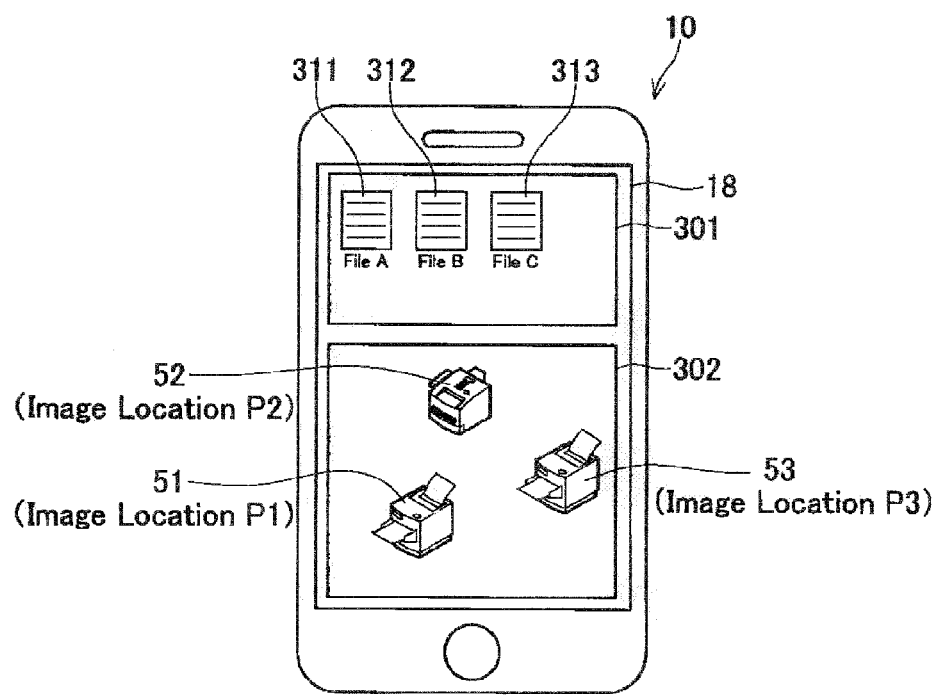
FIG. 20 is a diagram showing an example of stored contents of a display table.
FIG. 21 is a first display example of a panel

A table memory area 12b, stores a display table TB2. FIG. 20 shows an example of the display table TB2. The display table TB2 is a table that stores the correspondence between display location image information and the MFPs. The display table TB2 stores an image location 261, MFP information 262, and display location image information 263c. The display location image information 263c, is information indicating the correspondence between the image locations of the partial images of the MFPs on the taken image and the display location images B1c, through B3c. Alternatively, the display location image information 263c, may be information indicating the correspondence between the MFPs and the display location images B1c, through B3c. The display location image information 263c, is identification information of the display location images B1c through B3c. The rest of the configuration of the display table TB2 shown in FIG. 20 is the same as the display table TB2 shown in FIG. 7, so the explanation is hereby omitted.

Various types of files are stored in the file storage area 12c. There are various types of files such as image files, text files, and so on. The basic program manages data in file units. In the present embodiment, a case in which there are three files stored in the file storage area 12c,, File A through File C, is explained.

A configuration of a first server 71 will be described. A storage unit 73 comprises an MFP information storage area 75. The MFP information storage area 75 is an area that stores the MFP identification information 230, the MFP location information 240, and the specifications information 250c, of the first MFP 51 through third MFP 53, respectively. The rest of the configuration of the communication system 1c, is the same as the communication system 1 shown in FIG. 1, so the explanation is hereby omitted.

Figure 16:
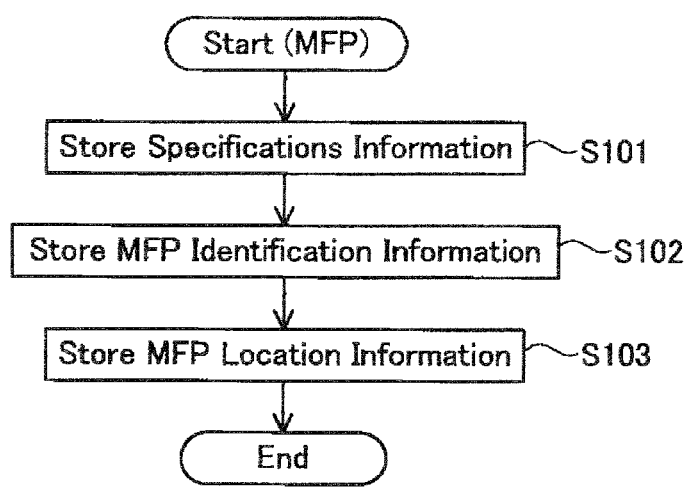
FIG. 16 is a diagram showing an operational flow chart of an MFP.

Operations of the communication system 1c, according to a fourth embodiment will be described with reference to FIGS. 16 to 23. The MFP registration flow is explained using FIG. 16. The flow in FIG. 16 is a process carried out by each of the first MFP 51 through the third MFP 53. As an example, a case where the flow is executed by the first MFP 51 in FIG. 16 is explained.

The flow of FIG. 16 starts in accordance with a registration instruction input by the user operating the button input unit 38. In S101, the CPU 32 stores the specifications information 250c in the MFP information storage area 75 of the first server 71. Specifically, the specifications information 250c, is transmitted to the first server 71 via the transceiver unit 36, the first access point 62, the internet 70, and the communication unit 74. In S102, the CPU 32 stores the MFP identification information 230 of the first MFP 51 in the MFP information storage area 75 of the first server 71.

In S103, the CPU 32 stores the MFP location information 240 of the first MFP 51 in the MFP information storage area 75 of the first server 71. The MFP location information 240 may be calculated by the GPS unit 44. Alternatively, it may be obtained as location information input by the user operating the button input unit 38. The operations of the second MFP 52 and the third MFP 53 are similar to that of the first MFP 51, so the detailed explanation thereof is hereby omitted.

Figure 17:
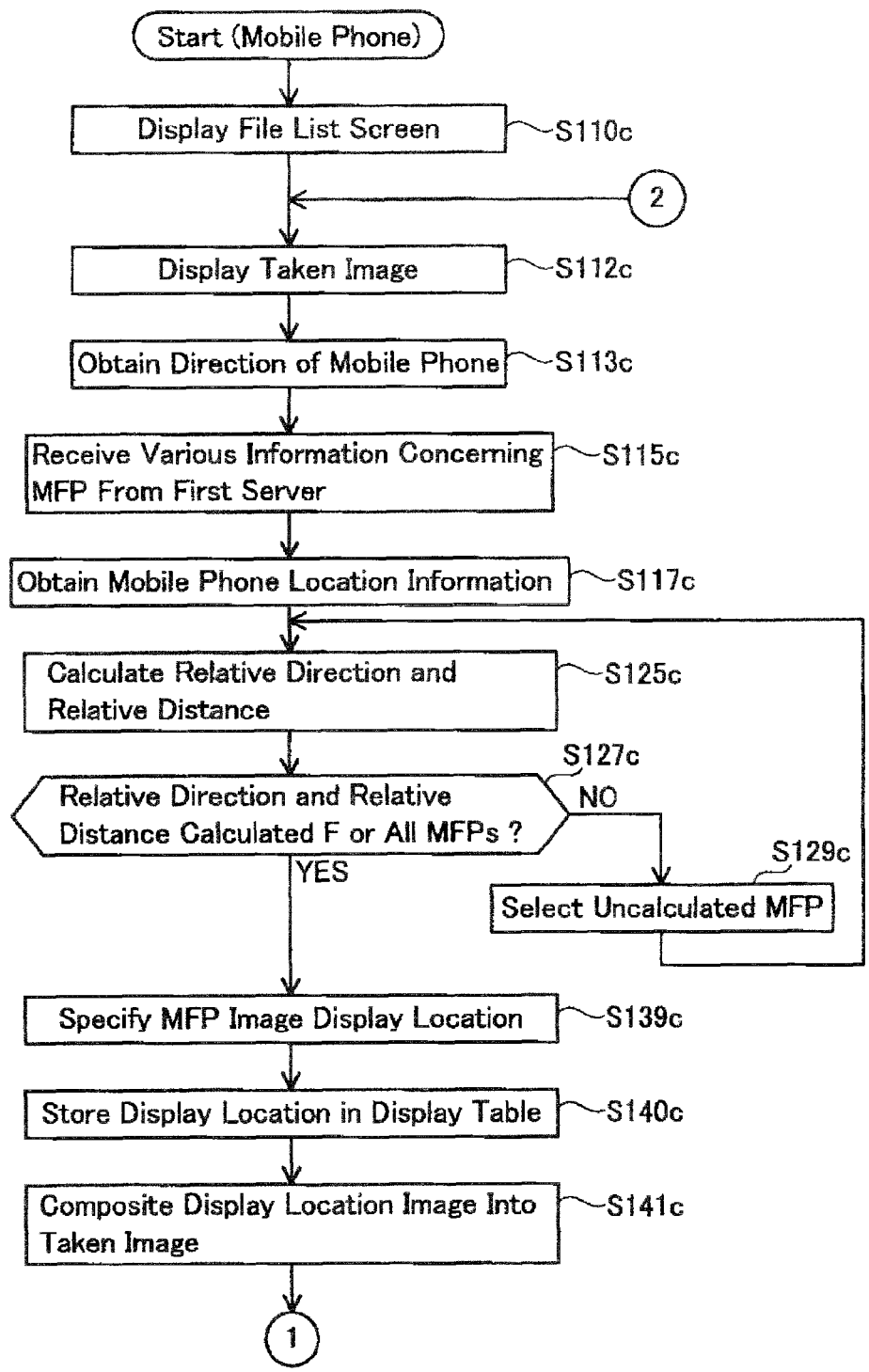
FIG. 17 is a diagram showing a fifth operational flow chart of a mobile phone.
Figure 18:
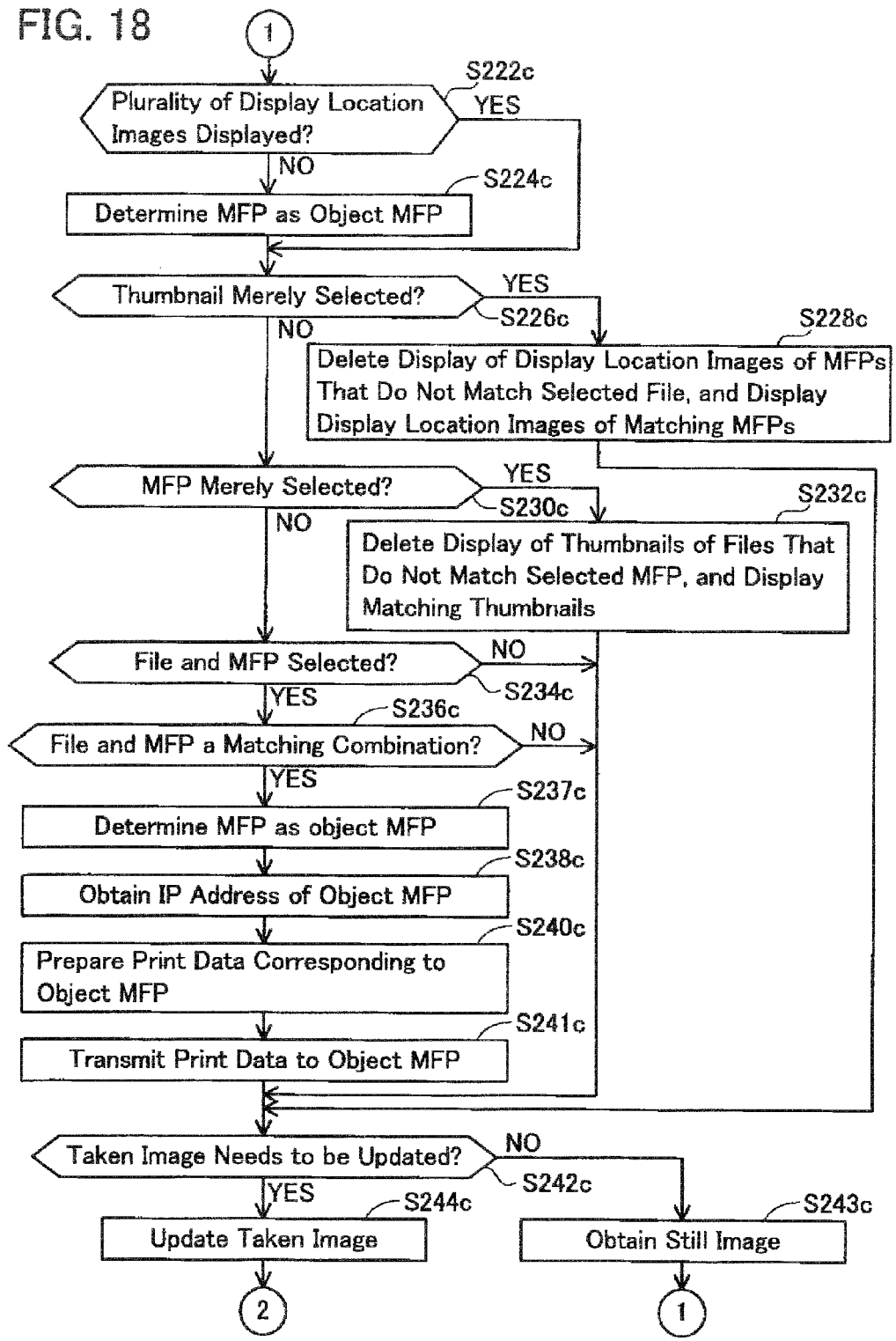
FIG. 18 is a diagram showing a sixth operational flow chart of a mobile phone.

A flow performed by the mobile phone 10 will be described with reference to FIGS. 17 and 18. The flows shown in FIGS. 17 and 18 are executed in response to activation of the printing application 28c, of the mobile phone 10. As an example, when the first MFP 51 through the third MFP 53 are disposed in the arrangement indicated in FIG. 5, the operation for pointing the camera unit 27 in the direction of the direction information V1 is explained below.

In S110c, on FIG. 17, the CPU 11 executes a process to display a file list screen 301 in the panel 18. Specifically, using the API of the basic program, thumbnails of File A through File C which are stored in the file storage area 12c, are displayed on the panel 18. FIG. 21 shows the upper half of the panel 18, and shows an example of the file list screen 301. Within the file list screen 301, a thumbnail 311 of File A, a thumbnail 312 of File B, and a thumbnail 313 of File C are displayed.

When the thumbnails are displayed, identification information of the displayed thumbnails (control) is returned by the API of the basic program, so this identification information is stored in the storage unit 12 in correspondence with the files. Thereafter, information (event messages) indicating whether the thumbnail (control) of identification information was touched or dragged, or the like are output by the basic program.

When the printing application 28c, is started by the user operating the button input unit 17 of the mobile phone 10, operation of the camera unit 27 starts, and an image is taken by the camera unit 27. In the example of FIG. 5, the image data within the range of an image angle A0 of the camera unit 27 is captured by the camera unit 27.

In S112c,, the CPU 11 executes a process to display the taken image 302 obtained by the camera unit 27 on the panel 18. Specifically, using the API of the basic program, the lower half of the panel 18 is used as the finder area of the camera unit 27 (the area where the output of the camera unit 27 is displayed). FIG. 21 shows an example of taken image shot by the camera unit 27 in the layout in FIG. 5. FIG. 21 shows the attitude of the taken image 302 displayed in the panel 18. As shown in FIG. 21, partial images of the first MFP 51 through third MFP 53 are displayed in the panel 18.

The detailed operation contents of the step of S113c, is the same as the contents of the step of S113 (FIG. 2), so detailed explanation is omitted here.

In S115c,, the CPU 11 executes a process to receive various kinds of information concerning MFPs located around the mobile phone 10 from the first server 71. Specifically, the CPU 11 causes the wireless transceiver unit 15 to transmit an acquisition request for the MFP identification information 230, the MFP location information 240, and the specifications information 250c, to the first server 71. Then the CPU 11 receives the MFP identification information 230, the MFP location information 240, and the specifications information 250c returned from the first server 71, and temporarily stores them in the storage table TB1.

The detailed operation contents of each of the steps of S117c, and S125c, are the same as the contents of each of the steps of S136 and S125 (FIG. 2) as explained for the first embodiment, so detailed explanation thereof is omitted here.

In S127c,, the CPU 11 determines whether or not the relative direction 241 and the relative distance 242 have been calculated for all MFPs whose various types of information are stored in the storage table TB1. If not calculated (S127c:, NO), the CPU 11 advances to S129c. In S129c,, the CPU 11 selects an uncalculated MFP and then returns to S125c. Accordingly, the relative direction and the relative distance can be acquired for all MFPs located around the mobile phone 10. On the other hand, in S127c,, if the calculation has been implemented for all MFPs (S127:YES), the CPU 11 advances to S139c.

In S139c,, the CPU 11 specifies at what location the MFP is displayed on the taken image 302 displayed on the panel 18.

The detailed operation contents of the step of S140c, is the same as the contents of the step of S313 (FIG. 3), so detailed explanation is omitted here.

In S141c,, the CPU 11 executes a process to composite a display location image at the location corresponding to the image location of the MFP partial image on the taken image 302. The display location image is displayed as a rectangular dotted line box.

Figure 22:
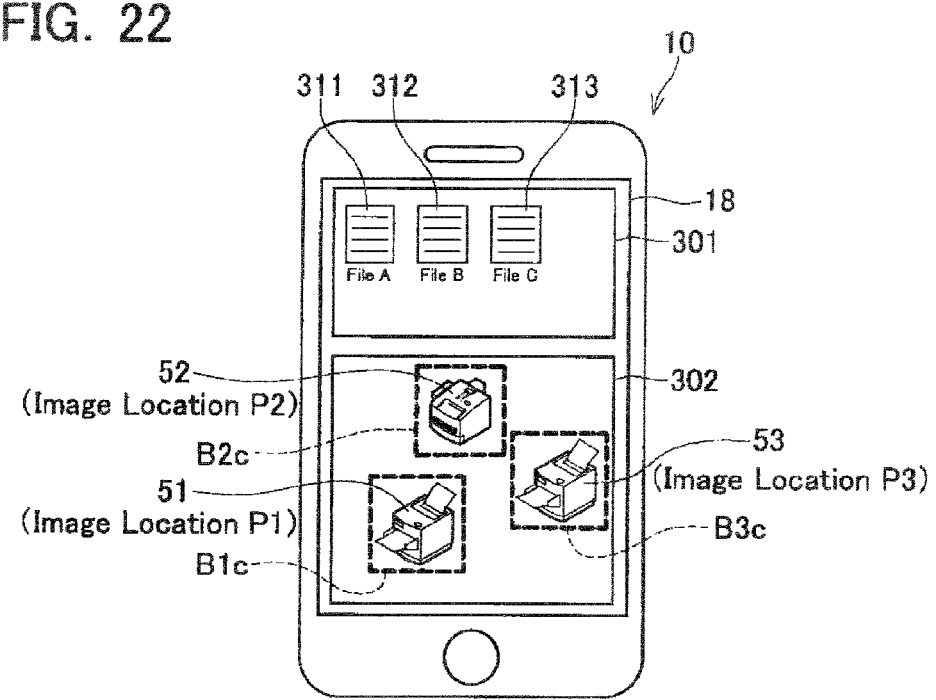
FIG. 22 is a third display example of a panel

FIG. 22 shows an example of the taken image 302 into which the display location image has been composited. At the location corresponding to the image location 261="P1" of the partial image of the first MFP 51, the display location image B1c, corresponding to the first MFP 51 is displayed. Likewise, at the location corresponding to the image location 261="P2" of the partial image of the second MFP 52, the display location image B2c, is displayed. At the location corresponding to the image location 261="P3" of the partial image of the third MFP 53, the display location image B3c, is displayed.

The following is an explanation of the relationship between the first MFP 51 through third MFP 53 and the display location images B1c, through B3c, displayed within the taken image 302. The display location images B1c, through B3c, are displayed using the API of the basic program. Using the API of the basic program, identification information of the displayed display location images (control) is returned, so this identification information is stored in the storage unit 12 in correspondence with the image location 261.

In S222c, of FIG. 18, the CPU 11 determines whether or not a plurality of display location images is displayed in the taken image 302. This determination is based on the number of controls stored in the storage unit 12. If a plurality of display location images is displayed (S222c:, YES), the CPU 11 advances to S226c. On the other hand, if a plurality is not displayed (S222c:, NO), it is determined that only one display location image is displayed, and the CPU 11 advances to S224c. In S224c,, the CPU 11 executes a process to store the MFP corresponding to the single display location image as the object MFP. The object MFP is the MFP that is the object of the data communication. Then the CPU 11 advances to S226c.

In S226c,, the CPU 11 determines whether or not the thumbnail displayed in the file list screen 301 is merely being selected by the user. Thumbnail selection is carried out by the user dragging a thumbnail displayed in the file list screen 301. The state in which the thumbnail is merely being selected by the user is the state in which the thumbnail in the file list screen 301 was dragged by the user, but the thumbnail was not dropped in the display location image within the taken image 302. If the thumbnail is just merely being selected (S226c:, YES) the CPU 11 advances to S228c.

In S228c,, the CPU 11 determines whether or not each MFP displayed in the taken image 302 matches the file corresponding to the selected thumbnail, based on the specifications information 250c. An example of an MFP that does not match the file is an MFP that does not handle PDF printing in the event that the currently selected file has a PDF format. Also, if the currently selected file is set to the XPS format, an MFP that does not handle XPS printing would be such an example.

Then, the CPU 11 executes a process to not display the display location images for MFPs that do not match the file corresponding to the selected thumbnail. Specifically, a process is executed to change the display location image to transparent, using the API of the basic program. Also, for MFPs that match the selected file, a process is executed to display their display location images. Specifically, a process is executed to change the display location images to a black color or the like, using the API of the basic program. Then the CPU 11 advances to S242c.

Figure 23:
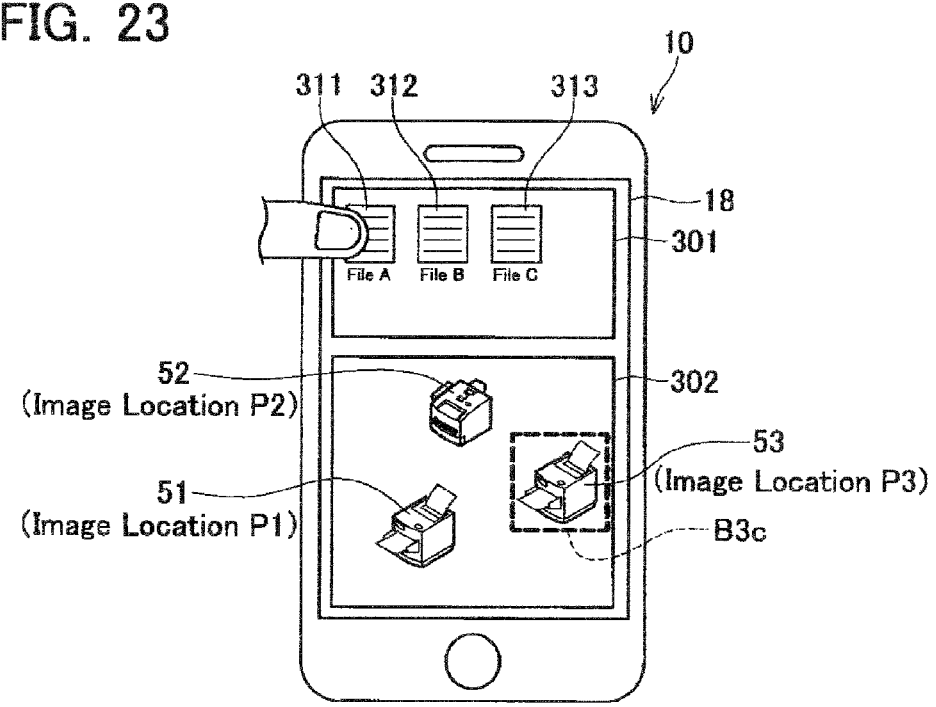
FIG. 23 is a fourth display example of a panel

The following is an explanation of an example of the operation at S228c,, using FIG. 23. As an example, a case is explained in which File A corresponding to the thumbnail 311 has XPS format. Also, a case in which the first MFP 51 and the second MFP 52 do not handle the XPS format, and the third MFP 53 handles the XPS format is explained. In this case, as shown in FIG. 23, when the user drags the thumbnail 311 (S226c:, YES), only the display location image B3c, of the third MFP 53 which matches File A is displayed. In this configuration it is possible to visually identify MFPs that match the selected file on the panel 18, so it is possible to increase the convenience of the user.

On the other hand, in S226c,, if it is not the case that the thumbnail only has been selected (S226c:, NO), the CPU 11 advances to S230c. In S230c,, the CPU 11 determines whether or not the user has merely selected the MFP displayed in the taken image 302. Selection of an MFP is carried out by the user touching the display location image displayed within the taken image 302. The state in which the user has merely selected the MFP is the state in which the thumbnail has not been dragged and the user has touched the display location image within the taken image 302, or the state in which a specific MFP is selected at S224c, and stored.

If the MFP has merely been selected (S230c:, YES), the CPU 11 advances to S232c. In S232c,, the CPU 11 determines whether or not each of the files corresponding to the thumbnails displayed in the file list screen 301 matches the selected MFP. Then the CPU 11 executes a process to not display the thumbnails for the files that do not match the selected MFP. Specifically, a process is executed using the API of the basic program to delete the displayed thumbnails. Also, for the files that match the selected MFP, a process is executed to display the thumbnail. Specifically, a process is executed using the API of the basic program to increase the density of the color of the thumbnail, or the like.

Also in S230c,, if it is not the case that the MFP has merely been selected (S230c:, NO), the CPU 11 advances to S234c. In S234c,, the CPU 11 determines whether or not at least any one of the files displayed in the file list screen 301 and any of the MFPs displayed in the taken image 302 have both been selected by the user. An example of the operation of selection of both file and MFP is the operation of dragging at least one of the thumbnails 311 through 313 with the tip of a finger and moving the tip of the finger to any of the display location images (drag and drop operation). Another example of the operation of selection of both file and MFP is the operation of dragging at least one of the display location images with the tip of a finger and moving the tip of the finger to any of the thumbnails 311 through 313 (drag and drop operation). If both file and MFP have not been selected (S243c:, NO) the CPU 11 advances to S242c,, and if they have been selected (S234c:, YES) the CPU 11 advances to S236c.

In S236c,, the CPU 11 determines whether or not the file and MFP selected at S234c, are a matching combination. If they are not a matching combination (S236c:, NO) the CPU 11 advances to S242c,, and if they are a matching combination (S236c:, YES) the CPU 11 advances to S237c. In S237c,, the CPU 11 identifies the display location image touched by the user. Then, using the display table TB2 (FIG. 20), the MFP information 262 corresponding to the identified display location image information 263c, is stored in the storage unit 12 as the MFP information of the object MFP.

In S238c,, the CPU 11 executes a process to obtain the IP address of the object MFP. Specifically, the CPU 11 reads the MFP identification information 230 (IP address) of the object MFP from the storage table TB1.

In S240c,, the CPU 11 executes a process to prepare the print data that can be processed by the object MFP. Specifically, the CPU 11 prepares the print data for the file selected in S234c based on the specifications information 250c, so that it matches the object MFP. In this configuration, it is possible to prevent transmission of the print data prepared from the selected file to the object MFP in an inappropriate format.

In S241c,, the CPU 11 causes the wireless transceiver unit 15 to transmit the print data to the object MFP. Specifically, the CPU 11 transmits the print data including the IP address of the object MFP in order to indicate the destination. The object MFP prints the print data using the printer 19, in accordance with the print data received.

In S242c, the CPU 11 determines whether or not there is a setting to update the taken image. Specifically, the CPU 11 determines whether or not the taken image update flag stored in the set value storage area 12a, is "Update". If the setting is to not update the taken image (S242c: NO), the CPU 11 advances to S243c. In S243c, the CPU 11 executes a process to delete the finder area using the API of the basic program. Also, the CPU 11 executes a process to have the camera unit 27 take a still image. Then, the CPU 11 executes a process to display the taken still image in the panel 18 as the taken image 302. Then the CPU 11 returns to S222c. On the other hand, if the setting is to update the taken image (S242c: YES), the CPU 11 advances to S244c. In S244c, the CPU 11 executes a process to update the taken image 302 obtained by the camera unit 27. Then the CPU 11 returns to S112c. In this configuration, by updating the taken image 302 in real time, it is possible to display the taken image 302 in the panel 18 as a moving image.

The following is an explanation of the effect of the communication system 1c, exemplified as the fourth embodiment as explained above. In the communication system 1c, it is possible to associate a file with an MFP by the operation of moving at least one file thumbnail and placing it on any one MFP display location image (the so-called drag and drop operation) or the operation of moving at least one MFP display location image and placing it on any one file thumbnail. In this configuration, it is possible to execute a simple procedure to associate which file is to be printed by which MFP. Therefore, it is possible to increase the convenience of the user.

Also, in the communication system 1c, the display location images of the MFPs that do not match the selected file are not displayed. In this configuration, it is possible to visually identify the MFPs easily that are not suitable for printing the selected file, so the convenience of the user can be increased.

Also, in the communication system 1c, the thumbnails of files that do not match the selected MFP are not displayed. In this configuration, it is possible to easily visually identify the files that are not suitable for printing by the selected MFP, so the convenience of the user can be increased.

Also, in the communication system 1c, it is possible to carry out a control to enable a file to be printed at an MFP only in the case that the combination of file and MFP is suitable. In this configuration, it is possible to prevent the situation where a user mistakenly prints a file at an unsuitable MFP.

While specific embodiments of the present invention have been described in detail above, such description is for illustrative purposes only and is not intended to limit the scope and claims of the invention. Techniques described in the claims of the invention include various modifications and changes made to the specific examples illustrated above. A modified example will now be described below.

In S312 (FIG. 3), when specifying the image locations of the partial images of the MFPs on the taken image displayed in the panel 18, an image recognition process may be used. In the image recognition process, the CPU 11 analyzes the shape of each object on the taken image. Then each location on the taken image where the shape of an MFP is reproduced is specified. As a result, it is possible to more accurately specify the image locations of the partial images of the MFPs.

In S314, the process of displaying the print buttons of MFPs for which wireless communication is not possible as grayed out to indicate the status that they cannot be selected was explained, but there is no limitation to this process. If the print button of an MFP that cannot carry out wireless communication is selected, a process may be carried out to switch the destination of the wireless communication so that the MFP corresponding to the print button can carry out wireless communication. For example, the following is an explanation of a case in which, in the communication system 1 of FIG. 1, wireless communication with the third MFP 53 is not possible because the mobile phone 10 is connected to the first access point 62 via the wireless communication 201. In this case, in the panel 18 shown in FIG. 9, when the user touches the print button PB3 that is grayed out, the CPU 11 may cut the communication to the first access point 62 via the wireless communication 201. Then, the mobile phone 10 may be connected to the second access point 63 using the wireless communication 202, to enable wireless communication with the third MFP 53. As a result, the print data is transmitted to the third MFP 53, and the print data can be printed using the printer 19 of the third MFP 53.

In S314, various formats may be used for the balloon information display format for the MFPs for which wireless communication is not possible. For example, a format may be used in which the print buttons of the MFPs for which wireless communication is not possible are not displayed in the panel 18.

In FIG. 9, a case has been explained as an example in which the "locations corresponding to the image locations of the partial images" are around the image location, but there is no limitation to this arrangement. "Locations corresponding to the image locations of the partial images" may be locations that overlap with the image locations. In this case, in FIG. 9 for example, the balloon information B1 may be displayed in a location that overlaps the partial image of the first MFP 51 on the image location 261="P1" of the first MFP 51.

In S318, the method of determining the object MFP is not limited to the method using the balloon information. The object MFP may be determined using the partial image itself In this case, in the flow of FIG. 3, S314 through S318 may be changed to the following explanation. The step of S314 (the step of compositing the balloon information to the location corresponding to the image location of the partial image) is not executed but skipped. After advancing to S316, the CPU 11 determines whether or not selection of the partial image of the MFP has been carried out. Specifically, the CPU 11 receives a selection image selection operation, using the button input unit 17. The selection image is an image selected by the user from among the images of the various objects included in the taken image taken by the camera unit 27, and displayed in the panel 18. The selection image selection operation may be carried out by the user directly touching the selection image in cases where the button input unit 17 functions as a touch panel. If the selection image selection operation has not been carried out (S316: NO) the CPU 11 advances to S320, and if it has been carried out (S316: YES) the CPU 11 advances to S318. In S318, the CPU 11 determines whether or not the selection image selected is a partial image (an image of the first MFP 51 through third MFP 53). As a specific example of the method of determination, the location touched by the user is calculated to be the image location of the selection image. Then, using the display table TB2 (FIG. 7), it is determined whether or not the image location of the selection image corresponds to the image location 261 of the partial image. When it is determined that it does correspond, the MFP name 231 corresponding to the specified image location 261 is determined As a result, it is possible to determine the object MFP as the MFP associated with the partial image selected by the user.

The object MFP may be determined by using the method of using the balloon information in combination with the method of using the partial image itself.

In this case, in S316 of the flow in FIG. 3, the CPU 11 may determine whether or not the print button or the partial image of the MFP has been selected. As a result, it is possible to determine the object MFP as the MFP associated with the print button or the partial image selected by the user.

Various methods may be used for the method of determining the MFP name 231 (S318) corresponding to the specified balloon information using the display table TB2 (FIG. 7). For example, the CPU 11 may specify the image location 261 associated with the selected print button. Then, the MFP name 231 corresponding to the specified image location 261 may be determined using the display table TB2 (FIG. 7).

In the second embodiment, there may be various routes by which the first server 71 acquires the MFP location information 240, the MFP identification information 230, the mobile phone 10 location information, and so on. In the second embodiment, the first server 71 receives the second data that includes the MFP location information 240 and the MFP identification information 230 from the mobile phone 10, but there is no limitation to this format. For example, the MFP location information 240 of the first MFP 51 through third MFP 53 may be stored in advance in the storage unit 73 of the first server 71. Then the first server 71 may receive from the mobile phone 10 only the mobile phone 10 location information. In this case, the first server 71 may search for the MFPs around the mobile phone 10 by comparing the mobile phone 10 location information and the MFP location information 240. As a result, by transmitting the mobile phone 10 location information to the first server 71, it is possible to obtain the MFP location information 240 and the identification information for the MFPs around the mobile phone 10 from the first server 71. Therefore, it is not necessary for the first MFP 51 through third MFP 53 to include a location measurement device such as the GPS unit 44 or the like, so it is possible to simplify the constitution of the first MFP 51 through third MFP 53.

For example, the first server 71 may receive the mobile phone 10 location information and the MFP identification information 230. In this case, the first server 71 may read the MFP location information 240 corresponding to the MFP identification information 230 from the storage unit 73. The route by which the first server 71 receives the MFP identification information 230 may be a route of directly receiving it from the first MFP 51 through third MFP 53, or a route of receiving it via the mobile phone 10.

Various modified examples can be adopted for the flow carried out by the mobile phone 10 as shown in FIG. 2. As a first modified example, steps S114 through S125 may be repeated every time a new network setting can be acquired. As a second modified example, the flow from S114 may be carried out again when the network connection is cut after the flow in FIG. 2 has started. In this case, in S125, the relative direction 241 and the relative distance 242 may be newly acquired again. As a result, it is possible to respond to cases in which the number of MFP that can be connected to the network is varying dynamically, such as in a case where the user is moving while operating the mobile phone 10, and the like.

As a third modified example, S114 through S124 may be repeatedly and continuously carried out when the power supply of the mobile phone 10 is turned on. Then, when the camera unit 27 acquires a taken image (S112), the flow from S125 may be started. As a fourth modified example, S114 through S125 may be repeatedly and continuously carried out when the power supply of the mobile phone 10 is turned on. Then, when the camera unit 27 acquires a taken image (S112), the flow from S134 may be started.

As a fifth modified example, in S138, the process of transmitting notification information notifying the intention to determine an MFP as the object MFP may be carried out by the wireless transceiver unit 15. Then if a reply signal such as an ACK signal or the like has not been received within a predetermined period of time, the print button PB within the balloon may be eliminated, and information urging the selection of another MFP may be displayed in the panel 18, as a first process example. A process to re-transmit notification information regarding the object MFP may be carried out by the wireless transceiver unit 15, after re-connecting to another access point, as a second process example. Then, if a reply signal has not been received from the object MFP even though notification information has been transmitted via all access points, information urging the selection of another MFP may be displayed in the panel 18. As a result, it is possible to more reliably communicate with the object MFP.

The method of determining the relative direction 241 is not limited to the method of S125. The relative direction 241 may be determined based on the characteristics of the radio wave when the mobile phone 10 receives data from the MFP. As a specific example, there is a method of obtaining the relative direction 241 of the MFP that is transmitting a radio wave by providing the mobile phone 10 with an antenna with directional characteristics. For example, there is a method of obtaining the relative direction 241 of the MFP that is transmitting a radio wave from the reception time lag of the radio waves by providing the mobile phone 10 with a plurality of antennae. As a result, it is possible to obtain the relative direction 241 even in cases where it is not possible to obtain the mobile phone 10 location information or the MFP location information 240.

The method of determining the relative distance 242 is not limited to the method of S125. The relative distance 242 may be calculated based on the radio field intensity of the wireless communication. As a result, it is possible to obtain the relative distance 242 even in cases where it is not possible to obtain the mobile phone 10 location information or the MFP location information 240.

Instead of the mobile phone 10, it is possible to use a device with a communication function, such as a notebook personal computer or the like. In this case, the communication program 28 may be various driver software installed on the notebook personal computer. The number of MFP connected to the communication system is not limited to three, there may be a plurality of MFPs.

The taken image taken by the camera unit 27 is not limited to a still image, but may also be a moving image.

For example, processing of S114 to S116 may be regularly executed in response to a boot up of the mobile phone 10, and, processing of S113 and then S118 may be executed under the condition that S112 is executed. For example, processing of S114 to S129 may be regularly executed in response to the boot up of the mobile phone 10, and processing of S113 and then S138 may be executed under the condition that S112 is executed.

For example, with respect to the MFP decided as the object MFP in S138, the wireless transceiver unit 15 may be configured to execute processing for transmitting a notification which notifies that the MFP has been decided as the object MFP. Subsequently, when a reply signal such as an ACK signal is not received within a predetermined period of time, the wireless transceiver unit 15 may be configured to execute processing for deciding another MFP as the object MFP and retransmitting the notification to the newly decided object MFP. Accordingly, communication with the object MFP can be performed more reliably.

For example, a configuration may be adopted in which the first server 71 regularly receives identification information and information indicating the physical location from the first and second MFPs 51 and 52 respectively and stores the information in the storage unit 73. In this case, upon receiving first data transmitted by the mobile phone 10 in S118, the first server 71 returns second data including the stored identification information and information indicating a physical location of the first and second MFPs 51 and 52 to the mobile phone 10. The second data returned by the first server 71 includes identification information of the mobile phone 10 for indicating the destination, identification information (IP address) of the first server 71 for indicating the source, and return information which indicates that the data is second data. In this case, upon receiving, in S120, the second data transmitted by the first server 71, the CPU 11 of the mobile phone 10 extracts MFP identification information and information indicating the physical location from the second data in S122 and temporarily stores the information in the storage table TB1.

In the second embodiment, various paths may exist along which the first server 71 acquires the MFP location information 240, the MFP identification information 230, location information of the mobile phone 10, and the like. In the second embodiment, while the first server 71 receives second data including the MFP location information 240 and the MFP identification information 230 from the mobile phone 10, such a mode is not restrictive. For example, MFP location information 240 for each of the first to third MFPs 51 to 53 may be stored in advance in the storage unit 73 of the first server 71. The first server 71 may receive only location information of the mobile phone 10 from the mobile phone 10. In this case, the first server 71 may be configured to search MFPs existing around the mobile phone 10 by comparing the location information of the mobile phone 10 with the MFP location information 240. Accordingly, by transmitting the location information of the mobile phone 10 to the first server 71, MFP location information 240 and identification information of MFPs existing around the mobile phone 10 can be received from the first server 71. As a result, since the first to third MFPs 51 to 53 need not include a location measuring device such as the GPS unit 44, a simplified configuration can be achieved.

Methods of deciding a relative direction 241 are not limited to the method of S125. Alternatively, the relative direction 241 may be identified based on radio wave characteristics when the mobile phone 10 receives data from the MFP. Specific examples include providing the mobile phone 10 with a directional antenna to obtain a relative direction 241 of an MFP transmitting radio waves. A method is conceivable in which the mobile phone 10 includes a plurality of antennas, and a relative direction 241 of an MFP transmitting radio waves can be obtained from a time lag in radio wave receptions. As a result, the relative direction 241 can be acquired even when the location information of the mobile phone 10 or the MFP location information 240 cannot be acquired.

Methods of deciding a relative distance 242 are not limited to the method of S125. A relative distance 242 may be calculated based on a radio field intensity of wireless communication. As a result, a relative distance 242 can be acquired even when location information of the mobile phone 10 or MFP location information 240 cannot be acquired.

Embodiments of the present teachings is not limited to the configuration in which the mobile phone 10 receives information indicating a physical location from an MFP, and stores the information in the storage table TB1 without modification as the MFP location information 240 of the MFP. Alternatively, the physical location received from the MFP may be converted to any data format that can easily be processed by the mobile phone 10, and then may be stored as the MFP location information 240 in the storage table TB1.

A device having a communication function such as a notebook personal computer can be used instead of the mobile phone 10. In this case, the communication program 28 may be various driver software installed in the notebook personal computer. The number of MFPs connected to the communication system need not be limited to three and a large number of MFPs may exist. Communication between the first access point 62 and the second access point 63 and the first to third MFPs 51 to 53 is not limited to a wireless LAN method and a wired LAN method may be used instead.

In S237$c_1$, the method of determining the object MFP is not limited to the method using the display location images B1$c$, through B3$c$. The object MFP may be determined using the partial image itself. In this case, in the flow of FIGS. 17 and 18, S141$c_1$, S230$c$, and S234$c$, may be changed to the following explanation. The step of S141$c$, (the step of compositing the display location image to the location corresponding to the image location of the partial image) is not executed but skipped. After advancing to S230$c$, and S234$c_1$, the CPU 11 determines whether or not selection of the partial image of the MFP has been carried out. Specifically, the CPU 11 receives a selection image selection operation, using the button input unit 17. The selection image is an image selected by the user from among the images of the various objects included in the taken image taken by the camera unit 27, and displayed in the panel 18. The selection image selection operation may be carried out by the user directly touching the selection image in cases where the button input unit 17 functions as a touch panel. The CPU 11 determines whether or not the selection image selected is a partial image (an image of the first MFP 51 through third MFP 53). As a specific example of the method of determination, the location touched by the user is calculated to be the image location of the selection image. Then, using the display table TB2 (FIG. 20), it is determined whether or not the image location of the selection image corresponds to the image location 261 of the partial image. When it is determined that it does correspond, the MFP information 262 corresponding to the specified image location 261 is determined As a result, it is possible to determine the object MFP as the MFP associated with the partial image selected by the user. Also, in S234$c_1$, according to the operation of dragging at least one of the thumbnails 311 through 313 and dropping it to any of the partial images or the operation of dragging at least one of the partial images and dropping it to any of the thumbnails 311 through 313, the operation of selecting both of the file and MFP can be realized. As a modification of the above, the step of S141$c$, (the step of compositing the display location image) may be executed, then the steps of S230$c$, and 234$c$, (the step of determining whether or not the partial image of MFP is selected) may be executed.

The operation of selecting the file and MFP that is accepted at S234$c$, is not limited to the drag and drop operation. An operation to create a state in which both of at least one of the thumbnails 311 through 313 and any one display location image on the panel 18 (a multi-touch operation) are touched may also be used. Also, an operation to touch at least one of the thumbnails 311 through 313 and any one display location image continuously for a required period of time on the panel 18 (a continuous touch operation) may also be used. In this configuration also, it is possible to execute a simple procedure to associate which file is to be printed by which MFP. Also, an operation to touch the partial images of MFP may be used alternatively to the operation to touch the display location images.

Also, in the fourth embodiment, the MFP registration flow (FIG. 16) may be started in accordance with various triggers. For example, the MFP main unit may periodically execute the flow of FIG. 16. Also, the flow in FIG. 16 may be executed in accordance with changes in the IP address of MFPs or locational information.

The flows of FIG. 17 and FIG. 18 may be started by various triggers. For example, while the file list screen 301 is displayed in the panel 18, the flow may be started in accordance with a file print command by the user operating the button input unit 17. In this case, S110c, is deleted from the flow of FIG. 17.

In S226c, (FIG. 18), the association between File A through File C stored in the file storage area 12c, and the thumbnails 311 through 313 displayed in the file list screen 301 can be executed by various methods. Also, in S230c,, the association between the first MFP 51 through third MFP 53 and the display location images B1c, through B3c, displayed in the taken image 302 can be executed by various methods. For example, the coordinates of the display areas of the thumbnails or the display location images may be stored, and if a thumbnail or a display location image is touched, the coordinates of the touched point may be obtained from the basic program. In this configuration, if the coordinates of the touch point are within a thumbnail display area, it can be determined that the file corresponding to the thumbnail has been selected. Also, if the coordinates of the touch point are within a display location image, it can be determined that the MFP corresponding to the display location image has been selected.

In S228c,, various patterns may be used for the display format for display location images corresponding to MFPs that do not match the selected file, for example, a gray-out display may be used. In this case, after deleting the display of the display location image, a new gray color display location image (control) may be displayed, and the association between the new display location image and the MFP may be stored over the former association.

In S241c,, the content of the communication with the object MFP is not limited to transmitting the print data. For example, communication may be executed in which data that includes the IP address of the object MFP in order to indicate the destination is transmitted to the object MFP as transmitted data, and data that includes the IP address of the object MFP (in other words, data transmitted by the object MFP) may be received as received data. Various types of data can be considered as the data handled by data communication. For example, process data may be transmitted to the object MFP, to cause the object MFP to execute a specific process. Also, a scan instruction may be transmitted to the object MFP, and the scan data generated by the object MFP using the scanner 20 may be received from the object MFP. Also, an IP telephone instruction may be transmitted to the object MFP, and voice or facsimile communication may be carried out via the modem 40 of the object MFP and the telephone line connection unit 41 with a telephone device or facsimile machine that exists on the telephone circuit.

In S242c,, determining whether or not the setting is to update the taken image need not be performed by the CPU 11. In this case, the taken image 302 is updated in real time, so the taken image 302 is displayed in the panel 18 as a moving image.

In S232c,, the method of processing the files that do not match the selected MFP may have various forms. For example, a process that ignores selection of a file that does not match the selected MFP may be executed by the CPU 11. One method example of a process that ignores a selection is to delete information indicating the relationship between the thumbnail control and the file. Also, another method is to store a flag that disables information indicating the relationship between the thumbnail control and the file, so that even if a message that there has been a touch, or the like, arrives, it will be determined that the file has not been selected.

It is also possible to omit the step S236c. For example, in S234c,, if a control is carried out that disables selection of an MFP that does not match the selected file, or a control is carried out that disables selection of a file that does not match the selected MFP, it is possible to omit S236c.

In S243c,, the process to obtain a still image may have various forms. For example, the still image may be obtained by storing the image displayed in the taken image 302 as a bitmap.

The specifications information 250c, stored in the storage table TB1 is not limited to model number information 251c, and file information 252c. For example, it may include sheet size information and print type information. Sheet size information is information indicating the sizes of the sheets used by the printer 19. Print type information is information indicating which of color printing and monochrome printing the printer 19 is set. In this configuration, in S228c,, it is possible to determine whether or not each MFP displayed in the taken image 302 matches the file corresponding to the selected thumbnail based on sheet size information or print type information.

In S139c,, it is possible to apply various methods to the process of specifying the image locations of the MFP partial images on the taken image 302. For example, the location of the MFPs on the taken image 302 may be calculated by image analysis, and the relative location of the MFP may be calculated with the location of the mobile phone 10 as the center. Then the absolute locations of the MFPs may be calculated from the location information of the mobile phone 10, and by comparing the calculated absolute locations and the MFP location information stored in the storage table TB1, the image location of the partial image of each MFP may be specified.

In S141c,, the case in which the identification information of the display location images (control) returned from the basic program is stored in the storage unit 12 in correspondence with the image locations 261 was explained, but there is no limitation to this configuration. The identification information of the display location images may be stored in correspondence with the MFP names 231.

The method of determining whether or not a plurality of display location images is displayed within the taken image 302 is not limited to the method explained for S222c. Information indicating the number of controls displayed in the bottom half of the panel 18 may be periodically output by the basic program, and the number of displays may be determined based on this information.

The manner by which MFPs that match the selected file are displayed, and the manner by which the files that match the selected MFP are displayed are not limited to those in S228c,, S232c, and so on. A displaying manner that maintains the current displaying manner of matching MFPs and files (e.g.: without changing to transparent, without deleting, without changing to a gray-out display) may be used.

The operation of selecting both file and MFP is not limited to that explained for S234c. For example, a configuration in which a thumbnail is selected when it is touched, and in this state if an MFP is touched then they are both selected may be used.

A specification in which the taken image 302 displayed in the finder area is constantly updated by the camera unit 27 and means realized by the CPU 11 executing the basic program, or the like, may be used. In this case, it is not necessary to execute the process of updating the taken image 302 (S244c).

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

Each program may be constituted by a single program module or by a plurality of program modules. Each example may adopt another replaceable configuration which is within the context of the present invention. Adoptable configurations include a computer (the CPU 11 or the like) which executes processing based on a program (the communication program 28 or the like), a computer which executes processing based on a program other than an image processing program such as an operating system and other applications, a hardware configuration (the panel 18 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of programs.

What is claimed is:

1. A computer-readable recording device storing a computer program including instructions for causing a computer of a mobile device to operate as:
    an image displaying module that displays a taken image on a touch panel provided in the mobile device,
        wherein the taken image is displayed based on image data obtained by the mobile device by taking an image of an object to be taken including a plurality of candidate devices with a camera unit provided in the mobile device;
    an image specifying module that specifies a plurality of partial images corresponding to the plurality of candidate devices within the taken image displayed on the touch panel,
        the image specifying module specifies the plurality of partial images based on first information, second information and third information,
        the first information indicates a physical location of the mobile device,
        the second information indicates a plurality of physical locations of the plurality of candidate devices,
        the third information indicates an image-taking direction of the camera unit,
        the image-taking direction is a direction having a location of the mobile device as reference;
        the image specifying module specifies each of the plurality of partial images based on an angular difference between the image-taking direction indicated by the third information and a relative direction between the mobile device and a corresponding candidate device,
        the relative direction is specified by a relative direction specifying unit based on the first information and the second information; and
    a communication controlling module that controls a communication unit configured to communicate using a wireless network, wherein the communication unit performs wireless communication with one candidate device corresponding to a specific position when the mobile device receives a touching operation by a user of touching the specific position on the touch panel corresponding to one partial image among the plurality of partial images displayed on the touch panel.

2. The computer-readable recording device as in claim 1, wherein
    the image specifying module specifies the plurality of partial images based on a result of an image recognition processing that is performed on the image data by a data processing unit.

3. The computer-readable recording device as in claim 1, wherein
    the image specifying module causes an information decision unit to decide the third information based on information that is calculated based on a direction indicated by a compass provided in the mobile device.

4. The computer-readable recording device as in claim 1, wherein
    the first information indicates the physical location of the mobile device at a moment when the camera unit takes the image of the object to be taken.

5. The computer-readable recording device as in claim 1, wherein
    a touching operation by the user of touching the one partial image corresponds to the touching operation by the user of touching the specific position on the touch panel corresponding to the one partial image, and
    in a case where the operation unit receives the touching operation by the user of touching the one partial image, the communication controlling module controls the communication unit to perform communication with the one candidate device corresponding to the one partial image.

6. A computer-readable recording device storing a computer program including instructions for causing a computer of a mobile device to operate as:
    an image displaying module that displays a taken image on a touch panel provided in the mobile device,
        wherein the taken image is displayed based on image data obtained by the mobile device by taking an image of an object to be taken including a plurality of candidate devices with a camera unit provided in the mobile device;
    an image specifying module that specifies a plurality of partial images corresponding to the plurality of candidate devices within the taken image displayed on the touch panel,
        the image specifying module specifies the plurality of partial images based on first information, second information and third information,
        the first information indicates a physical location of the mobile device,
        the second information indicates a plurality of physical locations of the plurality of candidate devices,
        the third information indicates an image-taking direction of the camera unit, and
        the image-taking direction is a direction having a location of the mobile device as reference; and a communication controlling module that controls a communication unit configured to communicate using a wireless network, wherein the communication unit performs wireless communication with one candidate device corresponding to a specific position when the mobile device receives a touching operation by a user of touching the specific position on the touch panel corresponding to one partial image among the plurality of partial images displayed on the touch panel, wherein the image displaying module causes the touch panel to display a composite image in which a candidate device information image representing information corresponding to a candidate device is composited with each of the plurality of partial images within the taken image, a touching operation by the user of touching one candidate device information image corresponding to the one partial image corresponds to the touching operation by the user of touching the specific position on the touch panel corresponding to the one partial image, in the case where the operation unit receives the touching operation by the user of touching the one candidate device information image corresponding to the one partial image, the communication controlling module controls the communication unit to perform communication with the one candidate device corresponding to the one partial image, and the image displaying module causes the touch panel to display a first candidate device information image and a second candidate device information image among a plurality of candidate device information images included in the plurality of composite images such that a display manner of the first candidate device information image is different from a display manner of the second candidate device information image, the first candidate device information image corresponds to a first candidate device which is capable of performing wireless communication, and the second candidate device information image corresponds to a second candidate device which is not capable of performing wireless communication.

7. The computer-readable recording device as in claim 6, wherein the image specifying module specifies the plurality of partial images based on a result of an image recognition processing that is performed on the image data by a data processing unit.

8. The computer-readable recording device as in claim 6, wherein the image specifying module causes an information decision unit to decide the third information based on information that is calculated based on a direction indicated by a compass provided in the mobile device.

9. The computer-readable recording device as in claim 6, wherein the first information indicates the physical location of the mobile device at a moment when the camera unit takes the image of the object to be taken.

10. The computer-readable recording device as in claim 6, wherein a touching operation by the user of touching the one partial image corresponds to the touching operation by the user of touching the specific position on the touch panel corresponding to the one partial image, and in the case where the operation unit receives the touching operation by the user of touching the one partial image, the communication controlling module controls the communication unit to perform communication with the one candidate device corresponding to the one partial image.

11. A computer-readable recording device storing a computer program including instructions for causing a computer of a mobile device to operate as:

an image displaying module that displays a taken image on a touch panel provided in the mobile device,
wherein the taken image is displayed based on image data obtained by the mobile device by taking an image of an object to be taken including a plurality of candidate devices with a camera unit provided in the mobile device;

an image specifying module that specifies a plurality of partial images corresponding to the plurality of candidate devices within the taken image displayed on the touch panel,
the image specifying module specifies the plurality of partial images based on first information, second information and third information,
the first information indicates a physical location of the mobile device,
the second information indicates a plurality of physical locations of the plurality of candidate devices,
the third information indicates an image-taking direction of the camera unit, and
the image-taking direction is a direction having a location of the mobile device as reference; and a communication controlling module that controls a communication unit configured to communicate using a wireless network, wherein the communication unit performs wireless communication with one candidate device corresponding to a specific position when the mobile device receives a touching operation by a user of touching the specific position on the touch panel corresponding to one partial image among the plurality of partial images displayed on the touch panel, wherein the image displaying module causes the touch panel to display a composite image in which a candidate device information image representing information corresponding to a candidate device is composited with each of the plurality of partial images within the taken image, a touching operation by the user of touching one candidate device information image corresponding to the one partial image corresponds to the touching operation by the user of touching the specific position on the touch panel corresponding to the one partial image, and in the case where the operation unit receives the touching operation by the user of touching the one candidate device information image corresponding to the one partial image, the communication controlling module controls the communication unit to perform communication with the one candidate device corresponding to the one partial image, the image specifying module specifies each of the plurality of partial images based on a relative distance between the mobile device and a corresponding candidate device, the relative distance is calculated by a relative distance calculating unit based on the first information and the second information, and the image displaying module causes the touch panel to highlight the candidate device information image corresponding to a relative distance that is relatively small.

12. The computer-readable recording device as in claim 11, wherein the image specifying module specifies the plurality of partial images based on a result of an image recognition processing that is performed on the image data by a data processing unit.

13. The computer-readable recording device as in claim 11, wherein
the image specifying module causes an information decision unit to decide the third information based on information that is calculated based on a direction indicated by a compass provided in the mobile device.

14. The computer-readable recording device as in claim 11, wherein
the first information indicates the physical location of the mobile device at a moment when the camera unit takes the image of the object to be taken.

15. The computer-readable recording device as in claim 11, wherein
a touching operation by the user of touching the one partial image corresponds to the touching operation by the user of touching the specific position on the touch panel corresponding to the one partial image, and
in the case where the operation unit receives the touching operation by the user of touching the one partial image, the communication controlling module controls the communication unit to perform communication with the one candidate device corresponding to the one partial image.

16. A computer-readable recording device storing a computer program including instructions for causing a computer of a mobile device to operate as:
an image displaying module that displays a taken image on a touch panel provided in the mobile device,
wherein the taken image is displayed based on image data obtained by the mobile device by taking an image of an object to be taken including a plurality of candidate devices with a camera unit provided in the mobile device;
an image specifying module that specifies a plurality of partial images corresponding to the plurality of candidate devices within the taken image displayed on the touch panel,
the image specifying module specifies the plurality of partial images based on first information, second information and third information,
the first information indicates a physical location of the mobile device,
the second information indicates a plurality of physical locations of the plurality of candidate devices,
the third information indicates an image-taking direction of the camera unit, and
the image-taking direction is a direction having a location of the mobile device as reference and a direction toward which a face of the mobile device with which the camera unit is equipped is facing, and the image-taking direction is acquired based on direction information acquired by using a compass provided in the mobile device; and
a communication controlling module that controls a communication unit configured to communicate using a wireless network, wherein the communication unit performs wireless communication with one candidate device corresponding to a specific position when the mobile device receives a touching operation by a user of touching the specific position on the touch panel corresponding to one partial image among the plurality of partial images displayed on the touch panel.

17. The computer-readable recording device as in claim 16, wherein
the image specifying module specifies the plurality of partial images based on a result of an image recognition processing that is performed on the image data by a data processing unit.

18. The computer-readable recording device as in claim 16, wherein
the first information indicates the physical location of the mobile device at a moment when the camera unit takes the image of the object to be taken.

19. The computer-readable recording device as in claim 16, wherein
the image specifying module specifies each of the plurality of partial images based on an angular difference between the image-taking direction indicated by third information and a relative direction between the mobile device and a corresponding candidate device, the relative direction being specified based on first information and second information.

20. The computer-readable recording device as in claim 16, wherein
a touching operation by the user of touching the one partial image corresponds to the touching operation by the user of touching the specific position on the touch panel corresponding to the one partial image, and
in a case where the operation unit receives the touching operation by the user of touching the one partial image, the communication controlling module controls the communication unit to perform communication with the one candidate device corresponding to the one partial image.

\* \* \* \* \*